(12) United States Patent
Kobayashi et al.

(10) Patent No.: US 11,442,259 B2
(45) Date of Patent: Sep. 13, 2022

(54) OPTICAL MICROSCOPE AND SPECTROSCOPIC MEASUREMENT METHOD

(71) Applicant: NANOPHOTON CORPORATION, Osaka (JP)

(72) Inventors: Minoru Kobayashi, Osaka (JP); Shogo Kawano, Osaka (JP); Taisuke Ota, Osaka (JP); Shunichiro Matsuzaka, Osaka (JP); Yusuke Shiozaki, Osaka (JP); Shota Yamauchi, Osaka (JP)

(73) Assignee: NANOPHOTON CORPORATION, Osaka (JP)

( * ) Notice: Subject to any disclaimer, the term of this patent is extended or adjusted under 35 U.S.C. 154(b) by 234 days.

(21) Appl. No.: 16/640,012

(22) PCT Filed: Aug. 17, 2018

(86) PCT No.: PCT/JP2018/030499
§ 371 (c)(1),
(2) Date: Feb. 18, 2020

(87) PCT Pub. No.: WO2019/035483
PCT Pub. Date: Feb. 21, 2019

(65) Prior Publication Data
US 2020/0249454 A1    Aug. 6, 2020

(30) Foreign Application Priority Data

Aug. 18, 2017  (JP) .............................. JP2017-157778

(51) Int. Cl.
*G02B 21/00* (2006.01)
*G02B 21/06* (2006.01)
(Continued)

(52) U.S. Cl.
CPC ........ *G02B 21/0048* (2013.01); *G01J 3/0208* (2013.01); *G01J 3/06* (2013.01);
(Continued)

(58) Field of Classification Search
None
See application file for complete search history.

(56) References Cited

U.S. PATENT DOCUMENTS

| | | |
|---|---|---|
| 4,997,242 A | 3/1991 | Amos |
| 6,243,189 B1 | 6/2001 | Ribes et al. |

(Continued)

FOREIGN PATENT DOCUMENTS

| | | |
|---|---|---|
| JP | 2006047780 A | 2/2006 |
| JP | 2007179002 A | 7/2007 |

(Continued)

OTHER PUBLICATIONS

ISA Japanese Patent Office, International Search Report Issued in Application No. PCT/JP2018/030499, dated Nov. 20, 2018, WIPO, 4 pages.

European Patent Office, Extended European Search Report Issued in Application No. 18846177.6, dated Mar. 31, 2021, Germany, 7 pages.

*Primary Examiner* — Derek S. Chapel
(74) *Attorney, Agent, or Firm* — McCoy Russell LLP

(57) ABSTRACT

An optical microscope according to one aspect of the present disclosure includes: a light source; a first scanner to scan a spot position of a light beam on a sample; an objective lens to focus the light beam deflected by the first scanner and cause the light beam to be made incident on the sample; a spectroscope including a slit on an incident side which an outgoing light emitted from an area on the sample onto which the light beam has been illuminated enters; a detector configured to detect an outgoing light from the spectroscope; and a first relay optical system including a first off-axis
(Continued)

parabolic mirror that is arranged in an optical path from the first scanner to the objective lens and reflects the light beam deflected by the first scanner and a second off-axis parabolic mirror that reflects the light beam reflected in the first off-axis parabolic mirror.

20 Claims, 10 Drawing Sheets

(51) Int. Cl.
*G02B 21/36* (2006.01)
*G01J 3/06* (2006.01)
*G01J 3/44* (2006.01)
*G01N 21/65* (2006.01)
*G01J 3/02* (2006.01)
*G01J 3/10* (2006.01)

(52) U.S. Cl.
CPC ............... *G01J 3/44* (2013.01); *G01N 21/65* (2013.01); *G02B 21/004* (2013.01); *G02B 21/06* (2013.01); *G02B 21/361* (2013.01); *G01J 2003/104* (2013.01)

(56) References Cited

U.S. PATENT DOCUMENTS

| | | | |
|---|---|---|---|
| 2007/0132994 | A1 | 6/2007 | Kobayashi et al. |
| 2010/0128263 | A1 | 5/2010 | Kobayashi et al. |

FOREIGN PATENT DOCUMENTS

| | | | |
|---|---|---|---|
| JP | 2009294159 | A | 12/2009 |
| JP | 2010127726 | A | 6/2010 |
| JP | 2011039542 | A | 2/2011 |
| JP | 2012229936 | A | 11/2012 |
| JP | 2016158708 | A | 9/2016 |
| JP | 2016212197 | A | 12/2016 |

OPTICAL MICROSCOPE AND SPECTROSCOPIC MEASUREMENT METHOD

CROSS-REFERENCE TO RELATED APPLICATIONS

The present application is a U.S. National Phase of International Patent Application Serial No. PCT/JP2018/030499 entitled "OPTICAL MICROSCOPE AND SPECTROSCOPIC MEASUREMENT METHOD", filed on Aug. 17, 2018. International Patent Application Serial No. PCT/JP2018/030499 claims priority to Japanese Patent Application No. 2017-157778 filed on Aug. 18, 2017. The entire contents of each of the above-referenced applications are hereby incorporated by reference for all purposes.

TECHNICAL FIELD

The present disclosure relates to an optical microscope and a spectroscopic measurement method.

BACKGROUND ART

Raman spectroscopy is advantageous in that measurement can be executed on samples of any form, for example, a gaseous form, a liquid form, a crystal form, and an amorphous form, irrespective of whether temperature is low or high, without using a special measurement atmosphere such as a vacuum atmosphere. In addition, the Raman spectroscopy is advantageous in that pretreatment of the sample can be omitted, and the sample can be measured as it is. Therefore, various measurements have been carried out utilizing these advantages. The application of the Raman spectroscopy enables identification of substances, measurement of concentration, and measurement of crystallinity, stress etc.

An optical microscope for carrying out the Raman spectroscopy is disclosed (Patent Literature 1 and 2). The optical microscope disclosed in Patent Literature 1 focuses a laser light to a sample and illuminates the sample with the laser light. Then a spectroscope disperses a Raman scattered light from the sample to thereby observe Raman spectrum. Further, this optical microscope deflects a laser light, scans a beam spot on the sample, then performs measurement, to thereby measure spectrum distribution in a specific region of the sample. Further, in order to shorten the measurement period, the beam spot is extended in one direction, the resultant beam spot is scanned, the sample is illuminated in a line form, and the Raman scattered light is detected by a CCD camera. Since the sample is illuminated in a line form, a wide area can be illuminated at one time, whereby the measurement period can be reduced. Further, by extending the beam spot, it is possible to prevent the sample from being damaged.

CITATION LIST

Patent Literature

[Patent Literature 1] Japanese Unexamined Patent Application Publication No. 2007-179002
[Patent Literature 2] Japanese Unexamined Patent Application Publication No. 2010-127726
[Patent Literature 3] U.S. Pat. No. 4,997,242

SUMMARY OF INVENTION

Technical Problem

There is a problem in the optical microscope disclosed in Patent Literature 1, however, that since the light beam is refracted by the lens, chromatic aberration occurs, whereby it becomes difficult to perform measurement in a wide wavelength band. Specifically, when a common optical system is used from a deep ultraviolet region of 200 nm to a near-infrared region of 2000 nm in the configuration shown in FIG. 1 of Patent Literature 1, chromatic aberration occurs in an optical system including lenses. Chromatic aberration occurs, for example, in lenses 14 and 16 (hereinafter, these lenses are referred to as a relay optical system A) for guiding a light beam deflected by a Y-directional scanning unit 13 to an X-directional scanning mirror 18, lenses 19 and 20 (hereinafter, these lenses are referred to as a relay optical system B) for guiding the light beam reflected in the X-directional scanning mirror 18 to an objective lens 21, and a lens 24 (hereinafter it will be referred to as a focus optical system) configured to focus the outgoing light from the sample 22 on the entrance slit 30.

In Patent Literature 1, it is difficult to correct chromatic aberration that occurs in the relay optical system A, the relay optical system B, and the focus optical system to near the diffraction limit. This is because, while chromatic aberration that occurs in lenses is typically corrected by combining a plurality of types of lens materials, correction of chromatic aberration including a deep ultraviolet region from 200 nm cannot be done since many optical glasses are opaque in a deep ultraviolet region, and available lens materials are limited to a small number of types such as synthetic quartz glass or calcium fluoride.

The present disclosure has been made in view of the aforementioned problem, and aims to provide an optical microscope and a spectroscopic measurement method capable of reducing aberrations.

Solution to Problem

An optical microscope according to one aspect of the present disclosure includes: a light source configured to generate a light beam; a first scanner configured to deflect the light beam and scan a spot position of the light beam on a sample; an objective lens configured to focus the light beam deflected by the first scanner and cause the light beam to be made incident on the sample; a spectroscope including a slit on an incident side which an outgoing light emitted from an area on the sample onto which the light beam has been illuminated enters; a two-dimensional array photodetector including light-receiving pixels arranged in an array, the two-dimensional array photodetector detecting an outgoing light from the spectroscope; and a first relay optical system including a first off-axis parabolic mirror and a second off-axis parabolic mirror, the first off-axis parabolic mirror being arranged in an optical path from the first scanner to the objective lens and reflecting the light beam deflected by the first scanner, and the second off-axis parabolic mirror reflecting the light beam reflected in the first off-axis parabolic mirror. According to this configuration, it is possible to reduce aberration.

The aforementioned optical microscope may further include a spectroscope configured to spatially disperse the outgoing light depending on the wavelength.

In the aforementioned optical microscope, geometric symmetry axes of paraboloids of the first off-axis parabolic mirror and the second off-axis parabolic mirror may be arranged to be parallel to each other and the paraboloids may be arranged to face in directions opposite to each other.

In the aforementioned optical microscope, a focal length of the first off-axis parabolic mirror may be equal to a focal length of the second off-axis parabolic mirror.

In the aforementioned optical microscope, when a distance from the focal point of the light beam between the first off-axis parabolic mirror and the second off-axis parabolic mirror to the first off-axis parabolic mirror is denoted by L2 and a distance from the focal point to the second off-axis parabolic mirror is denoted by L3, the ratio of L2 to L3 may be equal to the ratio of the focal length of the first off-axis parabolic mirror to the focal length of the second off-axis parabolic mirror.

In the aforementioned optical microscope, when a distance from the first scanner to the first off-axis parabolic mirror is denoted by L1 and a distance from the second off-axis parabolic mirror to an entrance pupil of the objective lens is denoted by L4, L1=L2 and L3=L4 may be satisfied. According to this configuration, it is possible to cause the light beam to pass substantially the center of the entrance pupil of the objective lens, whereby it is possible to prevent the laser intensity and the spatial resolution from being changed in the entire measurement area.

In the aforementioned optical microscope, the first relay optical system may further include: a first correcting lens having a positive power provided between the first off-axis parabolic mirror and a focal point of the light beam; and a second correcting lens having a positive power provided between the focal point and the second off-axis parabolic mirror. According to this configuration, it is possible to reduce aberrations.

In the aforementioned optical microscope, when a distance from the first correcting lens to the focal point is denoted by L5 and a distance from the focal point to the second correcting lens is denoted by L6, L5=L6 is preferably satisfied.

The aforementioned optical microscope may further include a focus optical system configured to focus the outgoing light descanned by the first scanner on the slit of the spectroscope, in which the focus optical system may include: a first concave mirror configured to reflect the outgoing light; and a first convex mirror configured to reflect the outgoing light reflected in the first concave mirror. It is therefore possible to correct the astigmatism.

In the aforementioned optical microscope, the first concave mirror and the first convex mirror may be spherical mirrors whose curvature radii are substantially equal to each other. According to this configuration, it is possible to reduce the Petzval sum and to reduce the curvature of field.

In the aforementioned optical microscope, an image plane of the sample imaged by the focus optical system may be inclined with respect to the incident plane of the slit. According to this configuration, it is possible to prevent a ghost image from being generated.

In the aforementioned optical microscope, a line that passes the center of curvature of the first concave mirror and the center of curvature of the first convex mirror may be inclined from a reference axis of the outgoing light that enters the first concave mirror.

The aforementioned optical microscope may further include: a second scanner that is provided in an optical path from the light source to the first scanner, deflects the light beam, and scans the spot position of the light beam on the sample; and a beam splitter that is provided in an optical path between the first scanner and the second scanner and separates the outgoing light emitted from the sample toward the spectroscope from the light beam emitted from the second scanner toward the first scanner, in which the first scanner may scan the spot position in a first direction that corresponds to a direction orthogonal to a longitudinal direction of the slit of the spectroscope, and the second scanner may scan the spot position in a second direction that corresponds to the longitudinal direction of the slit.

The aforementioned optical microscope may further include: a second relay optical system arranged in an optical path between the second scanner and the first scanner, in which the second relay optical system may include: a second concave mirror configured to reflect a light beam from the second scanner; a second convex mirror configured to reflect the light beam reflected in the second concave mirror; a third convex mirror configured to reflect the light beam reflected in the second convex mirror; and a third concave mirror configured to reflect the light beam reflected in the third convex mirror, and the second concave mirror and the second convex mirror may be arranged to be symmetrical with the third concave mirror and the third convex mirror with respect to an intermediate image plane which is between the second convex mirror and the third convex mirror. According to this configuration, it is possible to correct coma aberration, distortion aberration, and astigmatism.

In the aforementioned optical microscope, the second concave mirror, the second convex mirror, the third concave mirror, and the third convex mirror may be spherical mirrors whose curvature radii are substantially equal to one another. It is therefore possible to correct the curvature of field.

In the aforementioned optical microscope, a line that passes the center of curvature of the second concave mirror and the center of curvature of the second convex mirror may be inclined from a reference axis of the light beam that enters the second concave mirror, and a line that passes the center of curvature of the third concave mirror and the center of curvature of the third convex mirror may be inclined from the reference axis of the light beam reflected in the third concave mirror.

The aforementioned optical microscope may further include: a second relay optical system arranged in an optical path between the second scanner and the first scanner, in which the light source may be capable of using the laser light beams having laser wavelengths different from each other by switching the laser light beams, the optical path of the laser light may be provided with a beam expander configured to adjust the degree of focus or the degree of divergence, the second relay optical system may include: a first relay lens configured to refract the light beam from the second scanner; a second relay lens configured to refract the light beam from the first relay lens to obtain a collimated light beam, the second relay lens causing the collimated light beam to be made incident on the first scanner; and a diaphragm arranged between the first relay lens and the second relay lens. According to this configuration, it is possible to correct chromatic aberration.

The aforementioned optical microscope may further include a third scanner that is provided just before the first scanner and scans the spot position of the light beam on the sample in the second direction, in which the third scanner may scan the light beam in the second direction depending on the angle of the first scanner so as to cancel a change in the spot position that occurs by distortion aberration of the first relay optical system. According to this configuration, it is possible to correct distortion aberration.

The aforementioned optical microscope may further include a processor configured to correct distortion aberration that occurs in the first relay optical system, in which spots of the light beam on the sample may be extended in a line form along the second direction, a plurality of pixels that detect the outgoing light from the linear area may be arranged in the two-dimensional array photodetector, and one-dimensional measurement data detected by the plurality of pixels may be interpolated, whereby distortion aberration may be corrected. According to this configuration, it is possible to easily correct distortion aberration.

The aforementioned optical microscope may further include an optical member configured to shrink a cross-sectional shape of the light beam in the second scanner in the second direction. According to this configuration, it is possible to prevent the sample from being damaged.

In the aforementioned optical microscope, the second direction that corresponds to a longitudinal direction of the slit may be along a direction that corresponds to a geometric symmetry axis of the first off-axis parabolic mirror.

A spectroscopic measurement apparatus according to this embodiment may be a spectroscopic measurement method for performing spectroscopic measurement by performing the following processing of: causing a light beam to be deflected by a first scanner; causing the light beam from the first scanner to be made incident on an objective lens via a first relay optical system; focusing the light beam by the objective lens and illuminating a sample with the light beam; collecting an outgoing light emitted from the sample by the objective lens; dispersing the outgoing light from the objective lens by a spectroscope; and detecting the outgoing light dispersed by the spectroscope, in which the first relay optical system includes a first off-axis parabolic mirror that is arranged in an optical path from the first scanner to the objective lens and reflects the light beam deflected by the first scanner and a second off-axis parabolic mirror that reflects the light beam reflected in the first off-axis parabolic mirror. According to this configuration, it is possible to reduce aberration.

Advantageous Effects of Invention

According to the present disclosure, it is possible to provide an optical microscope and a spectroscopic measurement method capable of reducing aberrations.

DESCRIPTION OF EMBODIMENTS

Figure 1:
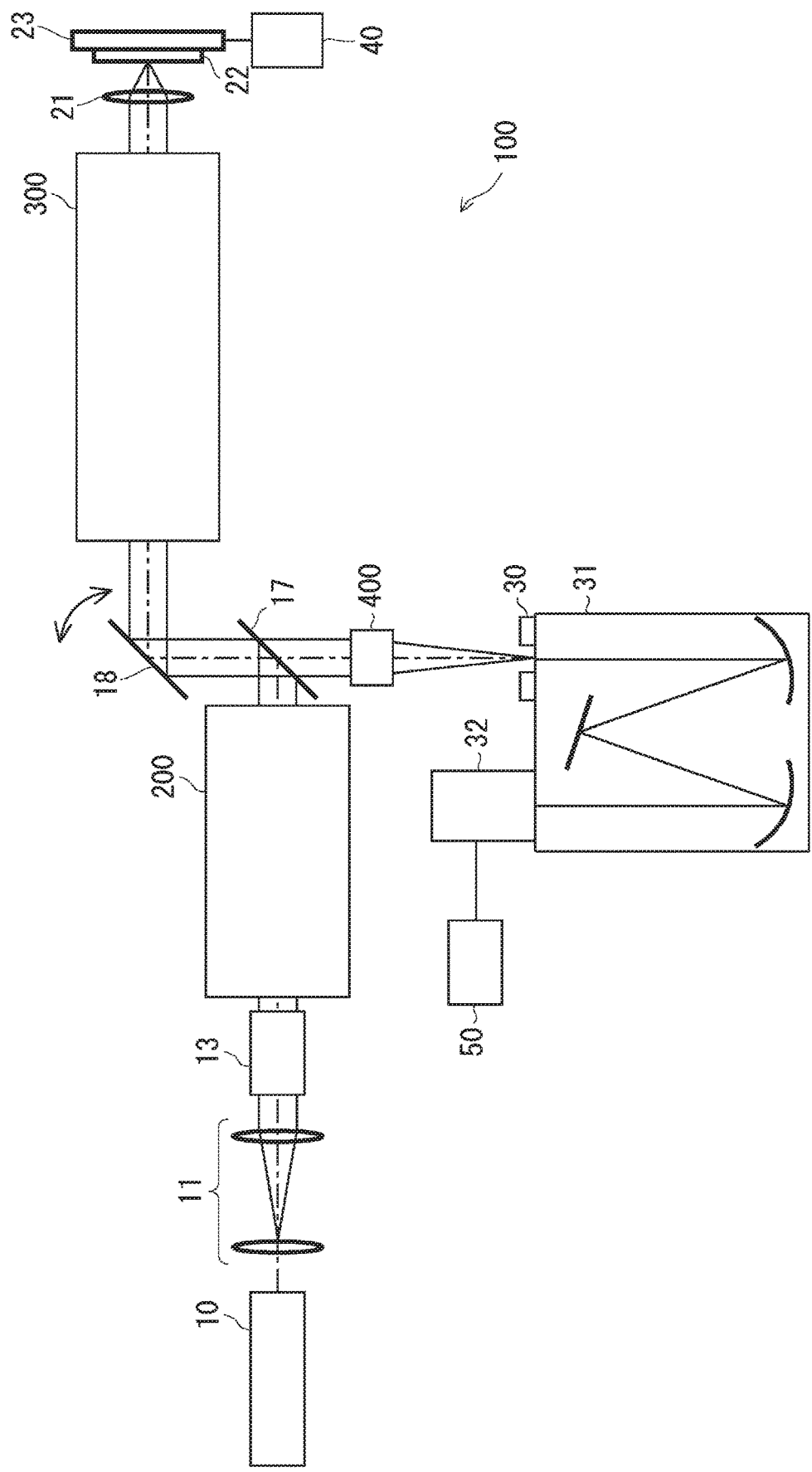
FIG. 1 is a diagram showing a configuration of an optical microscope according to an embodiment.

An embodiment to which the present disclosure can be applied will be now described. The following description explains the embodiment of the present disclosure and the disclosure is not limited to the following embodiment. For ease of explanation, the following description is given in an abbreviated and simplified manner as appropriate. Those skilled in the art will recognize that components in the following embodiment can be readily changed, added, and replaced within the scope of the disclosure. Here, the same components are denoted by identical reference numerals, and description thereof is omitted as necessary.

Referring to FIG. 1, an optical microscope according to an embodiment of the present disclosure will be described. FIG. 1 is a diagram schematically showing the overall structure of an optical system of an optical microscope 100 according to this embodiment. The optical microscope 100 includes, as the structure for observing a sample 22, a light source 10, a beam expander 11, a Y-directional scanning unit 13, a first relay optical system 200, a beam splitter 17, an X-directional scanning mirror 18, a second relay optical system 300, an objective lens 21, a stage 23, a focus optical system 400, a spectroscope 31, a detector 32, a stage driver 40, and a processor 50. Further, the spectroscope 31 is provided with an entrance slit 30 on an incident side thereof. Even when the scanning angles by the X-directional scanning mirror 18 and the Y-directional scanning unit 13 are changed, a reference axis (optical axis) is the Z axis, the light traveling direction is a positive direction, and the X axis and the Y axis are the left-handed system. Even when the scanning angles by the X-directional scanning mirror 18 and the Y-directional scanning unit 13 are changed, the Z axis is made constant.

The optical microscope 100, which is a Raman microscope, allows a light beam from the light source 10 to enter the sample 22 and detects a Raman scattered light from the sample 22 by the detector 32. Further, the spectroscope 31 disperses the Raman scattered light, and thus spectroscopic measurement can be performed on Raman spectrum. In addition, the optical microscope 100 enables scanning in XY direction (horizontal direction) and the Z direction (vertical direction). Hence, a three-dimensional Raman spectrum image can be measured.

First, the overall structure of the optical microscope 100 is described with reference to FIG. 1. The light source 10 is a laser light source that emits a monochromatic laser light. As the light source 10, for example, Millennia available from Spectra Physics, inc. can be used. The light source 10 is an Nd/YVO4 laser with a laser wavelength of 532 nm, a laser linewidth of 0.24 nm, and the maximum power of 10 W. The light source 10 emits a laser light of the above laser wavelength. Further, a plurality of laser light sources may be used as the light source 10 while switching the laser wavelength depending on the band where spectroscopic measurement is required. That is, it is possible to use the light source 10 that is available by switching laser light beams having laser wavelengths different from each other.

The light beam from the light source 10 is expanded by the beam expander 11 and then enters the Y-directional scanning unit 13. The Y-directional scanning unit 13 is, for example, an acousto-optic device or a galvano mirror. The Y-directional scanning unit changes an output angle of the incident light beam to deflect the light beam. As a result, an incident position of the light beam is moved along the Y direction on the sample 22. That is, the Y-directional scanning unit 13 scans the light beam in the Y direction. Incidentally, a deflection angle of the light beam of the Y-directional scanning unit 13 is controlled in accordance with electric signals from the processor 50. The light beam deflected by the Y-directional scanning unit 13 enters the relay optical system 200. The details of the relay optical system 200 will be explained later.

The light beam from the relay optical system 200 enters the beam splitter 17. The beam splitter 17 is, for example, a dichroic mirror, which reflects light of a laser wavelength toward the sample 22. As the dichroic mirror, "edge filter" available from Semrock Inc. can be used. The light reflected by the beam splitter 17 enters the X-directional scanning mirror 18. The X-directional scanning mirror 18 is, for example, a galvano mirror, and an angle of a reflection surface is changed to thereby deflect the light beam. That is, an angle of the reflection surface of the X-directional scanning mirror 18 to the optical axis is changed, so the output angle of the light beam can be changed. As a result, the incident position of the light beam is moved along the X direction on the sample 22. Hence, the light beam can be moved in the X direction. Incidentally, the deflection angle of the light beam in the X-directional scanning mirror 18 is controlled in accordance with electric signals from the processor 50. Here, the X direction and the Y direction are orthogonal to each other. The X-directional scanning mirror 18 and the Y-directional scanning unit 13 scan the sample in the XY direction, and thus a two-dimensional area can be scanned on the sample 22.

The light beam scanned by the X-directional scanning mirror 18 enters the relay optical system 300. The details of the relay optical system 300 will be explained later. The light beam from the relay optical system 300 enters the objective lens 21. The objective lens 21 focuses the light beam, and causes this light beam to be made incident on the sample 22. That is, the objective lens 21 focuses the light beam onto the sample 22 to illuminate the sample 22. As a result, a spot-like area of the sample 22 is illuminated. As the objective lens 21, a Schwarzschild-type reflective objective lens can be used, as will be explained later. Alternatively, a plurality of objective lenses attached to a microscope nose piece turret or the like may be used while switching them depending on the laser wavelength.

A part of the light incident on the sample 22 is Raman-scattered. Out of the light incident on the sample 22, light emitted toward the objective lens 21 due to Raman scattering is referred to as "outgoing light". That is, out of the Raman scattered light, light incident on the objective lens 21 is the outgoing light. The wavelength of the Raman-scattered outgoing light is different from that of the incident light. That is, the outgoing light is scattered with a frequency that deviates from an incident light frequency by Raman shift. A spectrum of the outgoing light is Raman spectrum. Therefore, by measuring the spectrum of the outgoing light, the chemical structure and the physical state of substances included in the sample 22 can be identified. That is, the Raman spectrum includes information about the vibrational information of a substance that composes the sample 22. Hence, if the outgoing light is dispersed by the spectroscope 31 and then detected, substances in the sample 22 can be identified.

Then, a focal position of the incident light is scanned in the XYZ direction to measure the spectrum of the outgoing light from all or a part of the sample 22, and it is possible to execute three-dimensional measurement of the Raman spectrum. By observing a specific wavelength out of the measured Raman spectrum, three-dimensional spatial distribution of a specific substance can be measured. To be specific, if the sample 22 is a living cell, spatial distribution of nucleic acids or lipids can be measured.

Incidentally, the sample 22 is placed on the stage 23. The stage 23 is, for example, an XYZ stage. The stage 23 is driven by the stage driver 40. The stage driver 40 moves the stage 23 in the XY direction to thereby illuminate a desired portion of the sample 22. Further, the stage driver 40 moves the stage in the Z direction to thereby change a distance between the objective lens 21 and the sample 22. Accordingly, the focal position of the objective lens 21 can be changed along the optical axis direction. The optical microscope 100 of the present disclosure constitutes a laser confocal microscope as described below. Thus, Z directional scanning is realized by changing the focal position. That is, if the stage is moved in the Z direction, a tomographic image of the sample 22 can be taken. Further, the Raman scattered light from a predetermined height of the sample 22 can be detected to enable measurement of a three-dimensional Raman spectrum image. The processor 50 outputs a control signal to the stage driver 40 to control the driving of the stage 23.

The outgoing light that is Raman-scattered on the sample 22 placed on the stage 23 and then enters the objective lens 21 propagates through the same optical path as that for the incident light. That is, the outgoing light is refracted or reflected by the objective lens 21 to enter the X-directional scanning mirror 18 via the relay optical system 300. The X-directional scanning mirror 18 reflects the incident outgoing light toward the beam splitter 17. At this time, the outgoing light is descanned by the X-directional scanning mirror 18. That is, the outgoing light is reflected by the X-directional scanning mirror 18 and thus propagates in a direction opposite to a traveling direction of the incident light that is incident on the X-directional scanning mirror 18 from the light source 10. Further, the Rayleigh scattered light from the sample 22 propagates through the same optical path as that for the Raman scattered light.

The outgoing light reflected by the X-directional scanning mirror 18 enters the beam splitter 17. The beam splitter 17 is, for example, a dichroic mirror. The beam splitter 17 splits the outgoing light from the sample 22 and the incident light emitted from the light source 10 to the sample 22 based on a wavelength. That is, the beam splitter 17 is set with its reflection surface inclined with respect to the optical axis of the incident light. The outgoing light from the sample 22 is transmitted through the beam splitter 17, so the optical axis of the outgoing light from the sample 22 is different from the optical axis of the incident light emitted from the light source 10 to the sample 22. Hence, the outgoing light from the sample 22 can be separated from the incident light emitted from the light source 10 to the sample 22.

Further, the beam splitter 17 as a dichroic mirror has characteristics of reflecting light of a laser wavelength and transmitting the Raman scattered light. Accordingly, Rayleigh scattered light from the sample 22 is reflected by the beam splitter 17, and Raman scattered light is transmitted through the beam splitter 17. That is, since a dichroic mirror is used as the beam splitter 17, the Rayleigh scattered light can be removed by utilizing a wavelength difference between the Rayleigh scattered light and the Raman scattered light. Further, almost all of the laser light from the light source 10 is reflected by the beam splitter 17 toward the sample 22. Therefore, a loss of the laser light can be minimized, and only the Raman scattered light can be efficiently detected. Incidentally, reflection characteristics of the dichroic mirror may be determined in accordance with a spectrum range as a measurement target. Here, the beam splitter 17 is provided between the sample 22 and the Y-directional scanning unit 13. Thus, the beam splitter 17 separates the outgoing light before descanning with the Y-directional scanning unit 13 from the light beam from the light source 10.

The outgoing light transmitted through the beam splitter 17 enters the entrance slit 30 provided on the incident side of the spectroscope 31 via the focus optical system 400. At this time, the focus optical system 400 focuses the outgoing light on the entrance slit 30. That is, the focus optical system 400 forms an enlarged image of an illuminated area of the sample 22 on the entrance slit 30. The details of the focus optical system 400 will be explained later. The entrance slit 30 has a linear opening. This opening extends along a direction corresponding to the Y direction. That is, the opening of the entrance slit 30 extends along a direction corresponding to a scanning direction (Y direction) of the Y-directional scanning unit 13 on the sample 22. Therefore, the scanning direction of the Y-directional scanning unit 13 corresponds to the longitudinal direction of the opening of the entrance slit 30.

The focus optical system 400 focuses the outgoing light on the entrance slit 30. Here, the incident light is focused into a spot-like image on the sample 22, so the outgoing light is condensed into a spot shape on the entrance slit 30. The direction in which the opening of the entrance slit 30 extends is matched with the scanning direction of the Y-directional scanning unit 13. The outgoing light enters the beam splitter 17 without being descanned by the Y-directional scanning unit 13. Hence, when scanning is performed by the Y-directional scanning unit 13, a spot position of the light beam is moved on the entrance slit 30 toward the linear opening of the entrance slit 30. The entrance slit 30 is provided such that the light moved on the sample 22 is focused into the opening of the entrance slit 30. In other words, the entrance slit 30 and the illuminated area of the sample 22 are arranged in such a way that they are in a conjugated relation. Therefore, Raman microscope is formed as a line confocal (slit confocal) optical system.

Then, the scattered outgoing light that exits from the sample 22 is condensed into a spot shape on the entrance slit 30. The entrance slit 30 has an opening extending along the Y direction, and the opening allows only the incident outgoing light to pass therethrough toward the detector 32. An illumination optical system from the light source 10 to the sample 22 and an observation optical system from the sample 22 to the detector 32 are configured as the above imaging optical system to thereby complete a confocal Raman microscope. This enables measurement with high resolution in the Z direction. Moving the stage 23 in the Z direction, the Raman scattered light from a desired height of the sample 22 can be separated from the Raman scattered light from the other heights thereof and then detected.

The outgoing light passed through the entrance slit 30 enters a main body of the spectroscope 31. The spectroscope 31 includes a dispersive device such as grating or prism. Thus, the spectroscope 31 spatially disperses the incident light from the entrance slit 30 in accordance with its wavelength. Regarding the spectroscope 31 that uses a reflective grating, there is additionally provided an optical system inclusive of a concave mirror guiding light from the entrance slit 30 to the dispersive device and a concave mirror guiding the light diffracted by the dispersive device to the detector 32. Needless to say, the structure of the spectroscope 31 is not limited to the above one. The outgoing light is dispersed by the spectroscope 31 toward a direction perpendicular to the direction of the entrance slit 30. That is, the spectroscope 31 executes wavelength dispersion of the outgoing light toward a direction perpendicular to the linear opening of the entrance slit 30. The outgoing light dispersed by the spectroscope 31 enters the detector 32. The detector 32 is an area sensor where light receiving devices are arranged in matrix. More specifically, the detector 32 is a two-dimensional array photodetector having arrayed pixels such as a two-dimensional CCD camera. The spectroscope 31 can disperse, for example, the wideband Raman scattered light from a deep ultraviolet region of 200 nm to a near-infrared region of 2000 nm. The spectroscope 31 may be a Fourier spectroscope. In this case, the outgoing light is not spatially dispersed in accordance with its wavelength and the detector 32 detects the outgoing light.

The detector 32 may be, for example, a cooled CCD for detection of light in a range from 200 nm to 1100 nm. Specifically, 1024×256-pixel electric cooled CCD (cooling temperature −75° C.) available from Princeton Instruments, inc. can be used as the detector 32. Further, an image intensifier may be attached to the detector 32. An InGaAs camera can be used for detection of light in a range from 1000 nm to 2000 nm. By switching the detector 32 depending on the bandwidth where spectroscopic measurement is to be performed, the detector 32 can be used for wideband spectrum measurement. Pixels of the detector 32 are arranged along a direction that corresponds to the entrance slit 30. Therefore, one arrangement direction of the pixels of the detector 32 coincides with the direction of the entrance slit 30, and the other arrangement direction coincides with the dispersion direction of the spectroscope 31. The direction of the detector 32 that corresponds to the direction of the entrance slit 30 is the Y direction (second direction), and the direction perpendicular to the entrance slit 30, that is, the direction in which the outgoing light is dispersed by the spectroscope 31, is the X direction (first direction).

As described above, the spectroscope disperses the wideband Raman scattered light from the deep ultraviolet region of 200 nm to the near-infrared region of 2000 nm in the X direction. The detector 32 has sensitivity for the light from the deep ultraviolet region of 200 nm to the near-infrared region of 2000 nm. The detector 32 outputs a detection signal that corresponds to the intensity of the outgoing light received by each pixel to the processor 50. The processor 50 is, for example, an information processing unit such as a personal computer (PC). The processor stores the detection signal from the detector 32 in a memory or the like. Then, the processor 50 executes predetermined processing on the detection result, and displays the resultant on a monitor. Further, the processor 50 controls the scanning with the Y-directional scanning unit 13 and the X-directional scanning mirror 18 and the driving of the stage 23. Here, the X direction of the detector 32 corresponds to the wavelength (frequency) of the outgoing light. That is, a pixel at one end of a pixel line in the X direction detects outgoing light of a long wavelength (low frequency), and a pixel at the other end detects outgoing light of a short wavelength (high frequency). In this way, the distribution of the light intensity in the X direction of the detector 32 is a Raman spectrum distribution.

Here, during a period in which the detector 32 takes an image of one frame, the Y-directional scanning unit 13 scans the light beam in the Y direction one or more times. That is, a scanning period of the Y-directional scanning unit 13 is made shorter than an exposure period, and the beam is scanned in the Y direction one or more times within the exposure period of one frame of the detector 32. According to this configuration, it is possible to measure Raman spectrum in the linear area in accordance with the scanning range in one frame of the detector 32. That is, the whole scanning range of the Y-directional scanning unit 13 is scanned within the exposure period. It is therefore possible to reduce the measurement period. Even if the Raman spectrum of, for example, a three-dimensional large area is measured, it is possible to prevent the measurement period from being long and to improve its practicability. Further, the Y-directional scanning unit 13 scans the light beam at a fast speed, whereby it is possible to prevent the sample from being damaged.

In this embodiment, the optical microscope 100 performs spectroscopic measurement on the wideband Raman scattered light from, for example, a deep ultraviolet region of 200 nm to a near-infrared region of 2000 nm. Therefore, the optical system for reducing aberrations is used. For example, the relay optical system 200, the relay optical system 300, and the focus optical system 400 are formed of reflecting mirrors, as will be described later. According to this configuration, it is possible to reduce chromatic aberration, whereby the optical microscope 100 can be applied to spectroscopic measurement in a wide band. In the following, each of the relay optical system 200, the relay optical system 300, and the focus optical system 400 will be explained.

Relay Optical System 300

Figure 2:
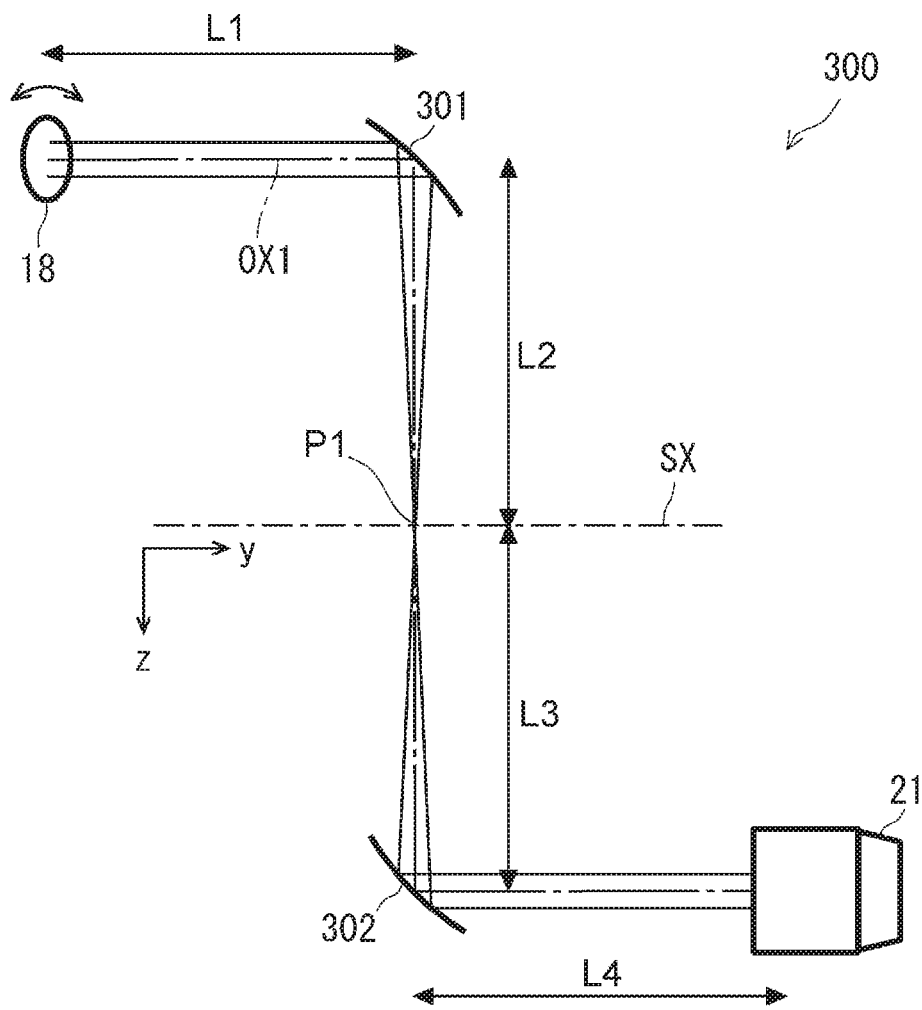
FIG. 2 is a diagram showing a configuration of a relay optical system.

First, with reference to FIG. 2, a configuration of the relay optical system 300 will be explained. FIG. 2 is a diagram showing a configuration of the relay optical system 300. While a off-axis symmetrical optical system will be explained in the following description, the line that the light that enters the pupil of the objective lens 21 at an incident angle of 0 degrees or the principal ray of the Raman scattered light (outgoing light) emitted at 0 degrees from the pupil of the objective lens 21 passes is referred to as a reference axis OX1. Even when the scanning angles by the X-directional scanning mirror 18 and the Y-directional scanning unit 13 are changed, the reference axis is set to be the Z axis, the light traveling direction is set to be the positive direction, and the X axis and the Y axis are the left-handed system. Unless otherwise specified, the distance between the optical elements is along the reference axis.

The relay optical system 300 is a reflection optical system including a first off-axis parabolic mirror 301 and a second off-axis parabolic mirror 302. The first off-axis parabolic mirror 301 and the second off-axis parabolic mirror 302, which are concave mirrors having paraboloids, are provided in such a way that the geometric focal point P1 of the paraboloid of the first off-axis parabolic mirror 301 and that of the second off-axis parabolic mirror 302 coincide with each other. The first off-axis parabolic mirror 301 and the second off-axis parabolic mirror 302 are provided in such a way that the geometric symmetry axes SX are parallel to each other and the paraboloids face in directions opposite to each other. For example, in FIG. 2, the paraboloid of the first off-axis parabolic mirror 301 faces on the left side and the paraboloid of the second off-axis parabolic mirror 302 faces on the right side. In FIG. 2, the geometric symmetry axis SX of the first off-axis parabolic mirror 301 coincides with the geometric symmetry axis SX of the second off-axis parabolic mirror 302. Further, the reference axis of the light beam that enters the first off-axis parabolic mirror 301 and the reference axis of the light beam reflected in the second off-axis parabolic mirror 302 are parallel to the geometric symmetry axis SX. The Y axis is within a plane that includes the geometric symmetry axis SX of the paraboloid. Specifically, the Y axis shown in FIG. 2 is parallel to the symmetry axis SX between the first off-axis parabolic mirror 301 and the second off-axis parabolic mirror 302.

The light beams, which are collimated light beams reflected in the X-directional scanning mirror 18, enter the first off-axis parabolic mirror 301. When the light beams enter the first off-axis parabolic mirror 301 along the reference axis OX1 (parallel incident), the light reflected in the first off-axis parabolic mirror 301 is focused on the geometric focal point P1 (intermediate focal point) of the paraboloid. Then the light reflected in the first off-axis parabolic mirror 301 enters the second off-axis parabolic mirror 302. The light reflected in the second off-axis parabolic mirror 302 becomes collimated light beam that is parallel to the reference axis, and enters the objective lens 21. The objective lens 21 is arranged in such a way that the optical axis of the objective lens 21 becomes parallel to the geometric axis of the second off-axis parabolic mirror 302.

In the relay optical system 300, the focal point distance of the first off-axis parabolic mirror 301 and that of the second off-axis parabolic mirror 302 are preferably made the same. It is therefore possible to minimize the curvature of field under a condition that the scanning range in the sample 22, the beam diameter of the light beam that enters the objective lens 21, and the distance from the X-directional scanning mirror 18 to the pupil of the objective lens 22 are made constant. The distance from the first off-axis parabolic mirror 301 to the focal point P1 along the reference axis is denoted by L1, the distance from the focal point P1 to the second off-axis parabolic mirror 302 is denoted by L2, the distance from the X-directional scanning mirror 18 to the first off-axis parabolic mirror 301 is denoted by L3, and the distance from the second off-axis parabolic mirror 302 to the entrance pupil of the objective lens 21 is denoted by L4. More preferably, $L1=L2=L3=L4$ is satisfied.

When, for example, the first off-axis parabolic mirror 301 and the second off-axis parabolic mirror 302 have paraboloids having a focal length of 76.2 mm and light that enters in parallel to the reference axis is reflected at an angle of 90 degrees, $L1=L2=L3=L4=152.4$ mm is satisfied. When $L1=L2=L3=L4$ is satisfied, even when the angle of the X-directional scanning mirror 18 is changed, the light beam passes substantially the center of the entrance pupil of the objective lens 21. As a result, even when the sample 22 is scanned by the X-directional scanning mirror 18, the changes in the laser intensity and spatial resolution can be prevented in the entire measurement area. As long as a slight increase in aberration is allowed, L1 and L4 may not be equal to each other and $L2=L3$ may be satisfied. Even under these conditions, when the angle of the X-directional scanning mirror 18 is changed, the light beam can be made to pass substantially the center of the entrance pupil of the objective lens. The focal length of the first off-axis parabolic mirror 301 and that of the second off-axis parabolic mirror 302 may be different from each other. In this case, the ratio of L2 to L3 is made equal to the ratio of the focal length of the first off-axis parabolic mirror 301 to the focal length of the second off-axis parabolic mirror 302, and L1=L2 and L3=L4 are satisfied.

When the off-axis parabolic mirror alone is used, a large aberration is generated except for the case of the parallel incident. However, by providing the first off-axis parabolic mirror 301 and the second off-axis parabolic mirror 302 in such a way that they face in directions opposite to each other with respect to the intermediate focal point (focal point P1), it is possible to provide the relay optical system 300 in which aberrations are canceled and spherical aberration, coma aberration, and astigmatism are corrected. When, for example, the angle of the X-directional scanning mirror 18 is changed, the light beams input to the first off-axis parabolic mirror 301 are not parallel incident. In this case, while the spot shape spreads due to an influence of aberration in the intermediate focal point, the light beams after being reflected in the second off-axis parabolic mirror 302 become a substantially complete collimated light beams since aberrations are canceled.

While the angle between the light that is made incident on the first off-axis parabolic mirror 301 and the principal ray of the reflected light (hereinafter this angle will be referred to as a reflection angle of the first off-axis parabolic mirror 301) is 90 degrees in FIG. 2, the optical system having the aforementioned properties can be obtained also when the reflection angle of the first off-axis parabolic mirror 301 is other than 90 degrees. For example, the reflection angle of the first off-axis parabolic mirror 301 may another angle such as 45 degrees or 60 degrees. However, in this case, the optical component and the optical path become close to the objective lens, whereby it becomes difficult to measure a large sample. When a large sample is measured, the reflection angle is preferably set to about 90 degrees and the optical component and the optical path are preferably separated from the objective lens. Since the distortion aberration increases when the reflection angle is made large, when a similar relay optical system is used in a telescope or the like, the reflection angle is designed to be as small as possible. In the relay optical system 300, distortion aberration can be corrected by adjustment of the angle of the X-directional scanning mirror 18 and data processing (correction of distortion aberration will be explained later). Therefore, the reflection angle can be set to about 90 degrees.

While the light beams from the X-directional scanning mirror 18 toward the objective lens 21 have been described above, in the relay optical system 300, the outgoing light from the objective lens 21 toward the X-directional scanning mirror 18 has a similar property as well. In FIG. 2, a configuration in which lenses are not used can be employed, whereby chromatic aberration can be eliminated.

Modified Example of Relay Optical System 300

Figure 3:
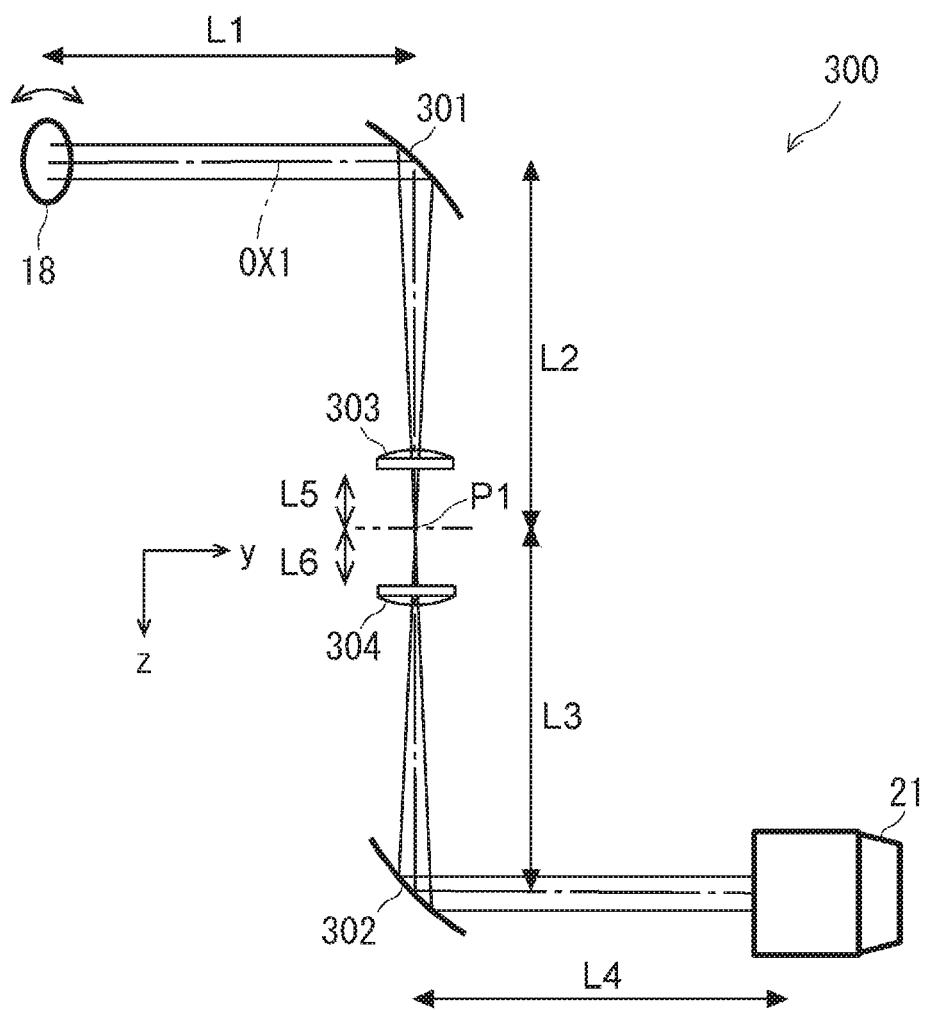
FIG. 3 is a diagram showing a configuration of a modified example of the relay optical system.

With reference to FIG. 3, a modified example of the relay optical system 300 will be explained. In FIG. 3, a first correcting lens 303 and a second correcting lens 304 are added to the components shown in FIG. 2. That is, the relay lens optical system 300 shown in FIG. 3 is a catadioptric system including the first off-axis parabolic mirror 301, the second off-axis parabolic mirror 302, the first correcting lens 303, and the second correcting lens 304. The descriptions of the configurations similar to those shown in FIG. 2 will be omitted as appropriate. In FIG. 3 as well, the first off-axis parabolic mirror 301 and the second off-axis parabolic mirror 302 are arranged in such a way that the geometric symmetry axes of the paraboloids become parallel to each other and the paraboloids face in directions opposite to each other. The Y axis is in a plane including the symmetry axis.

The first correcting lens 303 and the second correcting lens 304 are lenses having a positive power. The first correcting lens 303 is arranged in the optical path from the first off-axis parabolic mirror 301 to the focal point P1. The second correcting lens 304 is arranged in the optical path from the focal point P1 to the second off-axis parabolic mirror 302. That is, the light beam reflected in the first off-axis parabolic mirror 301 enters the first correcting lens 303. The light beam refracted by the first correcting lens 303 enters the second correcting lens 304. The light beam refracted by the second correcting lens 304 enters the second off-axis parabolic mirror 302. The light beam reflected in the second off-axis parabolic mirror 302 enters the objective lens 21. The first off-axis parabolic mirror 301 and the first correcting lens 303 focus the light beam on the focal point P1.

By adding the first correcting lens 303 and the second correcting lens 304, each having an optimized positive power, it is possible to correct the curvature of field that the optical system shown in FIG. 2 has. The first correcting lens 303 and the second correcting lens 304 are preferably arranged in the vicinity of the focal point P1 as much as possible. According to this configuration, the chromatic aberration occurred by the first correcting lens 303 and the second correcting lens 304 can be made negligibly small. Further, the material of the first correcting lens 303 and the second correcting lens 304 may be preferably synthetic quartz glass or calcium fluoride. According to this configuration, the relay optical system 300 can be used in a wide wavelength band including a deep ultraviolet region.

The first correcting lens 303 and the second correcting lens 304 are added between the first off-axis parabolic mirror 301 and the second off-axis parabolic mirror 302. Therefore, the geometric focal point of the paraboloid of each of the first off-axis parabolic mirror 301 and the second off-axis parabolic mirror 302 does not coincide with the focal point P1 of the light beam, unlike FIG. 2.

The distance from the first correcting lens 303 to the focal point P1 is denoted by L5 and the distance from the focal point P1 to the second correcting lens 304 is denoted by L6. Under a condition that the reflected light of the second off-axis parabolic mirror 302 becomes collimated light beam that is parallel to the geometric axis of the second off-axis parabolic mirror 302 when collimated light beams enter the first off-axis parabolic mirror 301 in parallel to each other, L5=L6 and L2=L3 are preferably satisfied.

By arranging the first off-axis parabolic mirror 301 and the first correcting lens 303 to be symmetrical with the first correcting lens 303 and the second correcting lens 304 with respect to the focal point P1, coma aberration and astigmatism can be canceled. In the relay optical system 300 in FIG. 3 as well, when L1=L4, L1 is preferably such a length that the light beam passes substantially the center of the entrance pupil of the objective lens 21 even when the angle of the X-directional scanning mirror 18 is changed. This L1 can be obtained by repeating tracing of rays that are inclined from the position of the X-directional scanning mirror 18 and acquisition of the intersection with the reference axis by changing L1. According to this configuration, it is possible to prevent the laser intensity and spatial resolution from being changed in the entire measurement area even when the X-directional scanning mirror 18 scans the sample 22.

It is assumed, for example, that light beams that enter the reference axis OX1 in parallel to each other are reflected in the direction of 90 degrees by the first off-axis parabolic mirror 301 using the first off-axis parabolic mirror 301 and the second off-axis parabolic mirror 302 having paraboloids with a focal length of 76.2 mm. Further, a plano-convex lens made of synthetic quartz glass having a focal length of 1000 mm and a central thickness of 2.2 mm is used for the first correcting lens 303 and the second correcting lens 304. In this case, when L1=L4=128.7 mm, L2=L3=152.7 mm, and L5=L6=20 mm are satisfied, the aforementioned conditions can be satisfied. Note that each of L5 and L6 is a distance from the focal point P1 to the plane side of the correcting lens.

Further, as long as a slight increase in aberration is allowed, L1 and L4 may not be equal to each other. In this case as well, when the angle of the X-directional scanning mirror 18 is changed, the light beam can be made to pass substantially the center of the entrance pupil of the objective lens 21.

The curvature of field can be corrected by providing a biconvex lens in the position of the focal point P1. When the biconvex lens is provided in the position of the focal point, the laser light is focused in the biconvex lens. Therefore, light emission such as a Raman scattered light is generated from a lens material, which may interfere with measurement of the Raman scattered light from the sample. Therefore, it is preferable to provide the first correcting lens 303 and the second correcting lens 304 in such a way that they are separated from each other with the focal point P1 provided therebetween, as shown in FIG. 3. When the first correcting lens 303 and the second correcting lens 304 are used, the light emission from the lens material does not interfere with measurement of the Raman scattered light from the sample since there is no lens material provided in the focal position.

The configuration shown in FIG. 2 or 3 may be used for the relay optical system 200. That is, the relay optical system shown in FIG. 2 or 3 may be arranged in the optical path from the Y-directional scanning unit 13 to the beam splitter 17. In this case, the light beam scanned by the Y-directional scanning unit 13 enters the first off-axis parabolic mirror 301.

Focus Optical System 400

Figure 4:
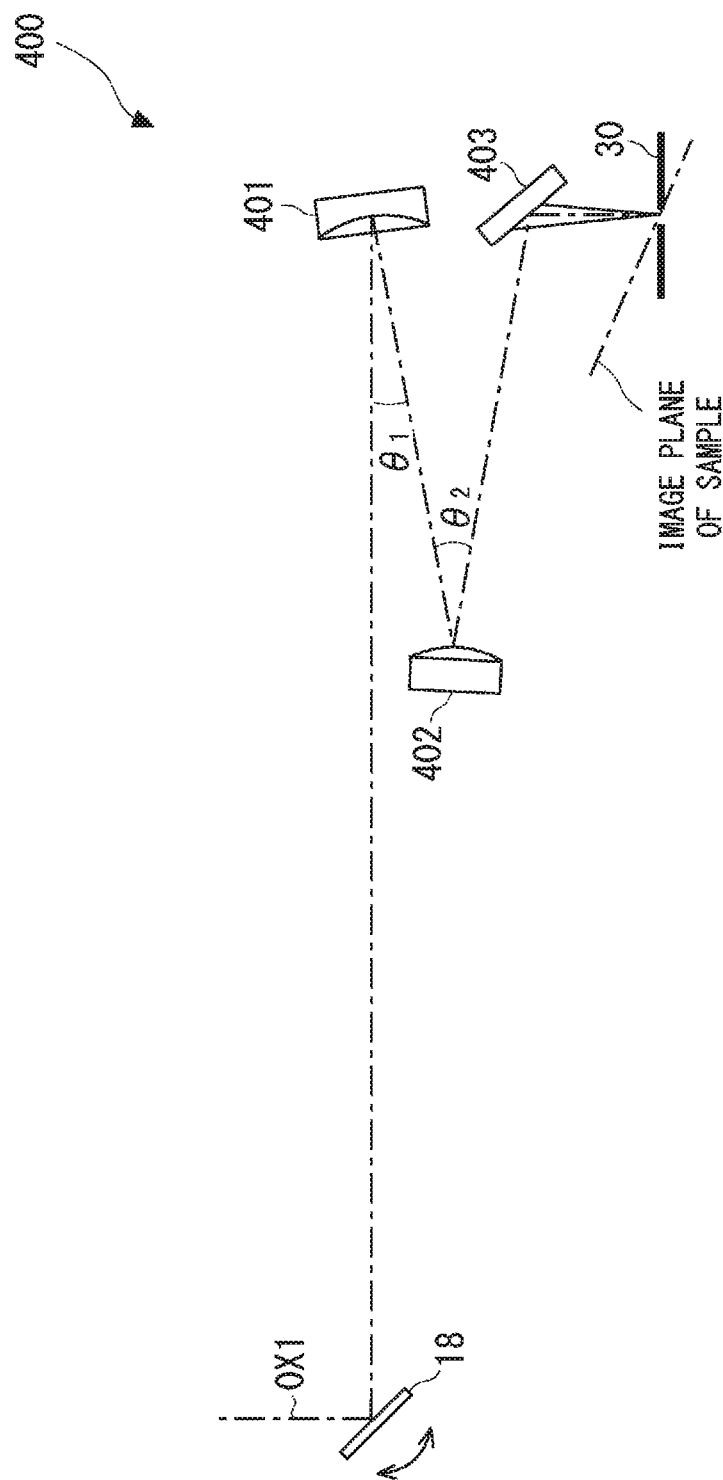
FIG. 4 is a diagram showing a configuration of a focus optical system.

Next, with reference to FIG. 4, a configuration of the focus optical system 400 will be explained. FIG. 4 is a diagram showing a configuration of the focus optical system 400. Specifically, FIG. 4 shows an optical system from the X-directional scanning mirror 18 to the entrance slit 30. In FIG. 4, the beam splitter 17 is omitted. In FIG. 4, the Y axis is perpendicular to the paper surface. The focus optical system 400 is a reflection optical system including a first concave mirror 401, a first convex mirror 402, and a plane mirror 403.

The outgoing light generated in the sample 22 is descanned by the X-directional scanning mirror 18. The outgoing light reflected in the X-directional scanning mirror 18 is reflected in the first concave mirror 401. The outgoing light reflected in the first concave mirror 401 is reflected in the first convex mirror 402. Then the outgoing light reflected in the first convex mirror 402 is reflected in the plane mirror 403. The outgoing light reflected in the plane mirror 403 enters the entrance slit 30. The first concave mirror 401 and the first convex mirror 402 focus the outgoing light in the entrance slit 30. Each of the first concave mirror 401 and first convex mirror 402 may be a spherical mirror. In this case, the curvature radius of the first concave mirror 401 and the curvature radius of the first convex mirror 402 may be substantially equal to each other. That the curvature radii are substantially equal means that the difference between the two curvature radii is, for example, within 10%. When this difference is within 10%, a sufficiently high aberration reduction effect can be obtained. In FIG. 4, the reflection angle of the first concave mirror 401 is denoted by θ1 and the reflection angle of the first convex mirror 402 is denoted by θ2.

When light does not incident normal to the first concave mirror 401 and the first convex mirror 402, which are spherical mirrors, astigmatism occurs. However, in the focus optical system 400, astigmatism can be corrected by optimizing the reflection angle θ1 in the first concave mirror 401 and the reflection angle θ2 in the first convex mirror 402. When astigmatism is corrected in this way, the line (symmetry axis) that passes the center of curvature of the first concave mirror 401 and the center of curvature of the first convex mirror 402 is not parallel to the reference axis of the light beam that enters the first concave mirror 401. That is, the line (symmetry axis) that passes the center of curvature of the first concave mirror 401 and the center of curvature of the first convex mirror 402 is inclined from the reference axis of the light beam that enters the first concave mirror 401. While an optical system in which aberration increases is obtained in an area outside a narrow area along the Y axis, a good image can be obtained along the opening part of the entrance slit 30. Further, in the focus optical system 400, the first concave mirror 401 and the first convex mirror 402 are used. By using the first concave mirror 401 and the first convex mirror 402 having curvatures close to each other, the Petzval sum and the curvature of field can be reduced. The Y axis is perpendicular to the plane including the reference axis and the symmetry axis.

In the focus optical system (lens 24) disclosed in Patent Literature 1, an image plane with respect to the surface perpendicular to the reference axis of the sample (hereinafter it will be simply referred to as an image plane) coincides with the incident plane of the entrance slit of the spectroscope. Therefore, the optical system can be easily adjusted. On the other hand, in the focus optical system 400 shown in FIG. 4, at the position of the entrance slit 30, the image plane of the sample and the entrance slit 30 are not parallel to each other. That is, the image plane of the sample imaged by the focus optical system 400 is inclined with respect to the incident plane of the entrance slit. The image plane of the sample is rotated about the Y axis with respect to the incident plane of the entrance slit. In other words, at the position of the entrance slit 30, the plane perpendicular to the reference axis OX1 and the image plane of the sample are not parallel to each other.

This is because the spectroscope 31 (see FIG. 1 since it is not shown in FIG. 4) is provided in such a way that the entrance slit 30 becomes perpendicular to the reference axis OX1. A spectroscope where the incident angle to the entrance slit 30 becomes equal to the incident angle to the detector 32 is used as the spectroscope 31. According to this configuration, although the procedure of adjusting the optical system becomes complicated, by setting the incident angle to the detector 32 to be 0 degrees, it is possible to prevent a ghost image from being generated due to reflection in the window of the detector 32 and the light receiving surface of the detector 32.

In the position of the entrance slit 30, the image plane of the sample and the entrance slit 30 do not become parallel to each other. Therefore, only the linear part of the sample 22 focuses in the slit. However, no problem occurs since only the area in which the entrance slit 30 is in focus is measured at one time. The linear area on the sample 22 illuminated with the laser light focuses in the entrance slit 30 regardless of the angle of the X-directional scanning mirror 18. When the angle at which the outgoing light is made incident on the entrance slit 30 is not equal to the angle at which the light is made incident on the detector 32, the outgoing light is made incident on the entrance slit 30 in such a way that the incident angle to the detector 32 becomes 0 degrees.

The distance from the X-directional scanning mirror 18 to the first concave mirror 401 is preferably a distance at which the principal rays of the outgoing light from the respective points on the sample 22 illuminated in a line form become perpendicular to the entrance slit 30. In other words, the distance from the X-directional scanning mirror 18 to the first concave mirror 401 is preferably a distance at which the imaging from the sample to the entrance slit 30 becomes telecentric. The distance at which the imaging becomes telecentric can be obtained by repeating ray tracing while changing the distance. A spectroscope whose inner optical system is a telecentric optical system is used as the spectroscope 31. According to this configuration, the outgoing light beams from the respective points on the line can be made normal incident on the detector 32. Therefore, it is possible to make the detection efficiency of the light from the respective points uniform and to prevent a ghost image from being generated.

A design example will be explained below. The curvature radius of the first concave mirror 401 and that of the first convex mirror 402 are made the same, that is, 200 mm. The distance from the first concave mirror 401 to the first convex mirror 402 along the reference axis OX is set to 55.11 mm, and the distance from the first convex mirror 402 to the slit is set to 81.42 mm. Further, by setting $\theta 1$ to be equal to 11.52 degrees and setting $\theta 2$ to be equal to 25.62 degrees, various aberrations are properly corrected. At this time, by setting the distance from the X-directional scanning mirror 18 to the first concave mirror 401 to be equal to 277.3 mm, telecentricity can be achieved.

In the focus optical system 400, the optical elements are provided in the order of the first concave mirror 401 and the first convex mirror 402 from the side of the sample 22 along the reference axis OX1. Since the optical elements are provided in this order, even when the distance is set to the one at which the imaging from the sample 22 to the entrance slit 30 becomes telecentric, the distance from the X-directional scanning mirror 18 to the focus optical system 400 can be increased. It is therefore possible to provide a space where the beam splitter 17, filters and the like are provided between the X-directional scanning mirror 18 and the focus optical system 400. If the optical elements are provided in the order of the first convex mirror 402 and the first concave mirror 401 to correct various aberrations, the distance between the X-directional scanning mirror 18 and the optical element is reduced at the distance at which telecentricity is achieved. Therefore, it becomes difficult to provide the space where the beam splitter 17, the filters and the like are provided. The optical elements are preferably provided in the order of the first concave mirror 401 and the first convex mirror 402 from the sample 22, as described in this embodiment.

Relay Optical System 200

Figure 5:
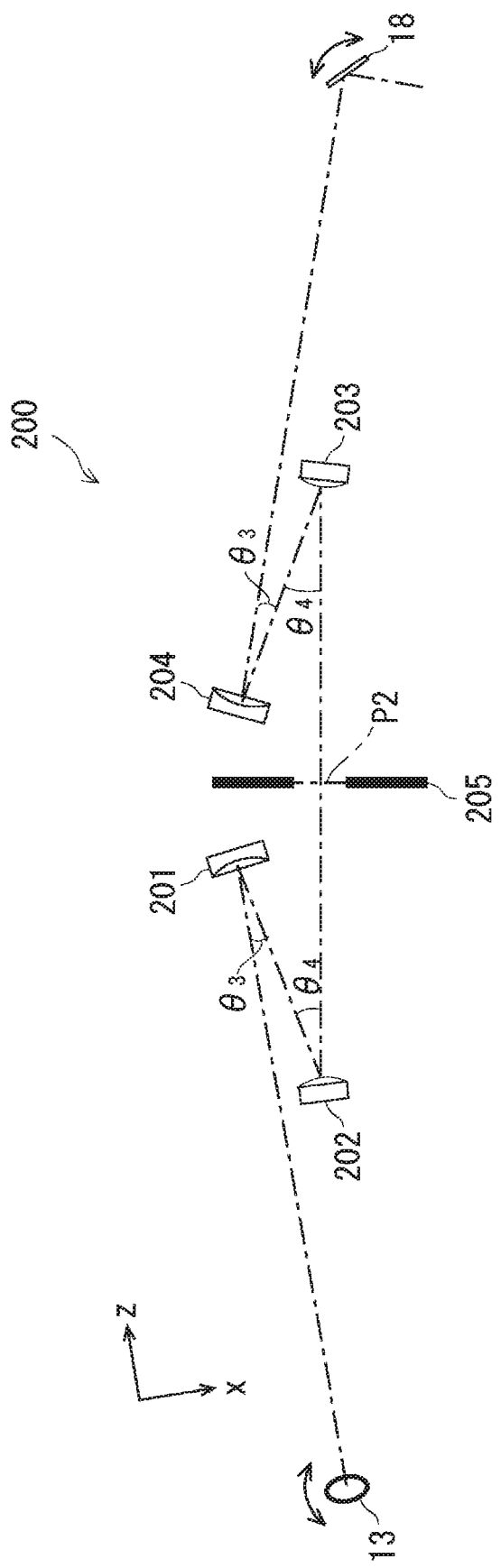
FIG. 5 is a diagram showing a configuration of a relay optical system 200.

Next, with reference to FIG. 5, a configuration of the relay optical system 200 will be explained. FIG. 5 is a diagram showing a configuration of the relay optical system 200. Specifically, FIG. 5 shows an optical system from the Y-directional scanning unit 13 to the X-directional scanning mirror 18. In FIG. 5, the beam splitter 17 is omitted. In FIG. 5, the Y direction is perpendicular to the paper surface. The relay optical system 200 is a reflection optical system including the second concave mirror 201, the second convex mirror 202, the third convex mirror 203, and the third concave mirror 204.

The light beam of the collimated light scanned by the Y-directional scanning unit 13 is reflected in the second concave mirror 201. The light beam reflected in the second concave mirror 201 is reflected in the second convex mirror 202. The second concave mirror 201 and the second convex mirror 202 focus the light beam on an intermediate image plane P2 in a spot shape. The light beam reflected in the second convex mirror 202 enters the third convex mirror 203. The third convex mirror 203 reflects the light beam toward the third concave mirror 204. The third concave mirror 204 reflects the light beam toward the X-directional scanning mirror 18. The light beam reflected in the third convex mirror 203 and the third concave mirror 204 becomes a collimated light beam. Therefore, the X-directional scanning mirror 18 scans the light beam of the collimated light.

A diaphragm 205 may be provided in the intermediate image plane P2. The diaphragm 205 has, for example, a circular opening, and shields external light beams. That is, the passage of the light beams deviated from the opening is restricted. The area in which the scanning speed of the Y-directional scanning unit 13 is not constant is preferably shielded by the diaphragm 205. According to this configuration, it is possible to make the illumination intensity in the linear area uniform.

The second concave mirror 201, the second convex mirror 202, the third convex mirror 203, and the third concave mirror 204 are spherical mirrors. The second concave mirror 201 and the second convex mirror 202 are arranged to be symmetrical to the third convex mirror 203 and the third concave mirror 204 with respect to the intermediate image plane P2. For example, the curvature radius of the second concave mirror 201 and that of the third concave mirror 204 are made substantially equal to each other. The curvature radius of the third convex mirror 203 and that of the second convex mirror 202 are made substantially equal to each other. That the curvature radii are made substantially equal to each other indicates that the difference between the two curvature radii is within 10%. When the difference is within 10%, a sufficiently high aberration reduction effect can be obtained. Further, the distance from the second concave mirror 201 to the second convex mirror 202 is made equal to the distance from the third convex mirror 203 to the third concave mirror 204. The distance from the second convex mirror 202 to the intermediate image plane P2 is made equal to the distance from the intermediate image plane P2 to the third convex mirror 203.

It is assumed that the reflection angle of the second concave mirror 201 is equal to the reflection angle of the third concave mirror 204 (hereinafter, this angle is referred to as a reflection angle $\theta 3$) and the reflection angle of the second convex mirror 202 is equal to the reflection angle of the third convex mirror 203 (hereinafter, this angle is referred to as a reflection angle $\theta 4$). By optimizing the distance from the Y-directional scanning unit 13 to the second concave mirror 201 and the distance from the third concave mirror 204 to the X-directional scanning mirror 18, even when the Y-directional scanning unit 13 has changed the angle of the light beam, the position in the X-directional scanning mirror 18 where the principal ray passes can be made substantially unchanged.

Patent Literature 3 discloses a relay optical system used between two scanning mirrors that are orthogonal to each other. The relay optical system disclosed in Patent Literature 3 is a reflection optical system that uses a concave mirror. However, the optical system disclosed in Patent Literature 3 cannot be used with a large beam diameter since it cannot sufficiently correct aberrations. In the relay optical system 200 shown in FIG. 5, astigmatism can be corrected by optimizing the reflection angle θ3 and the reflection angle θ4.

In this case, the line (symmetry axis) that passes the center of curvature of the second concave mirror 201 and the center of curvature of the second convex mirror 202 are not parallel to the reference axis of the light beam that enters the second concave mirror 201. That is, the line that passes the center of curvature of the second concave mirror 201 and the center of curvature of the second convex mirror 202 is inclined from the reference axis of the light beam that enters the second concave mirror 201. Further, the line (symmetry axis) that passes the center of curvature of the third convex mirror 203 and the center of curvature of the third concave mirror 204 is not parallel to the reference axis of the light beam that is reflected in the third concave mirror 204 and travels toward the X-directional scanning mirror 18. That is, the line that passes the center of curvature of the third concave mirror 203 and the center of curvature of the third convex mirror 204 is inclined from the reference axis of the light beam that is reflected in the third concave mirror 204 and travels toward the X-directional scanning mirror 18. According to this configuration, astigmatism can be corrected. Note that the Y axis is perpendicular to the plane including the reference axis and the symmetry axis.

Further, by using the second concave mirror 201, the second convex mirror 202, the third convex mirror 203, and the third concave mirror 204 having curvatures close to one another, the curvature of field can be corrected, and by arranging them to be symmetrical, coma aberration and distortion aberration are corrected. Accordingly, the relay optical system 200 according to the present disclosure can be used with a beam diameter larger than that of the optical system disclosed in Patent Literature 3.

A design example of the relay optical system 200 will be explained. The curvature radius of the second concave mirror 201, that of the second convex mirror 202, that of the third convex mirror 203, and that of the third concave mirror 204 are made the same, that is, 200 mm. The distance from the second concave mirror 201 to the second convex mirror 202 along the reference axis OX is set to 55.11 mm, the distance from the second convex mirror 202 to the intermediate image plane P2 is set to 81.42 mm, the distance from the intermediate image plane P2 to the third convex mirror 203 is set to 81.42 mm, and the distance from the third convex mirror 203 to the third concave mirror 204 is set to 55.11 mm. Further, θ3 is set to be 11.52 degrees and θ4 is set to be 25.58 degrees. According to this configuration, it is possible to properly correct various aberrations. At this time, each of the distance from the Y-directional scanning unit 13 to the second concave mirror 201 and the distance from the third concave mirror 204 to the X-directional scanning mirror 18 is set to 277.26 mm, whereby the position in the X-directional scanning mirror 18 where the principal ray passes can be made substantially unchanged even when the angle of the beam is changed by the Y-directional scanning unit.

Figure 6:
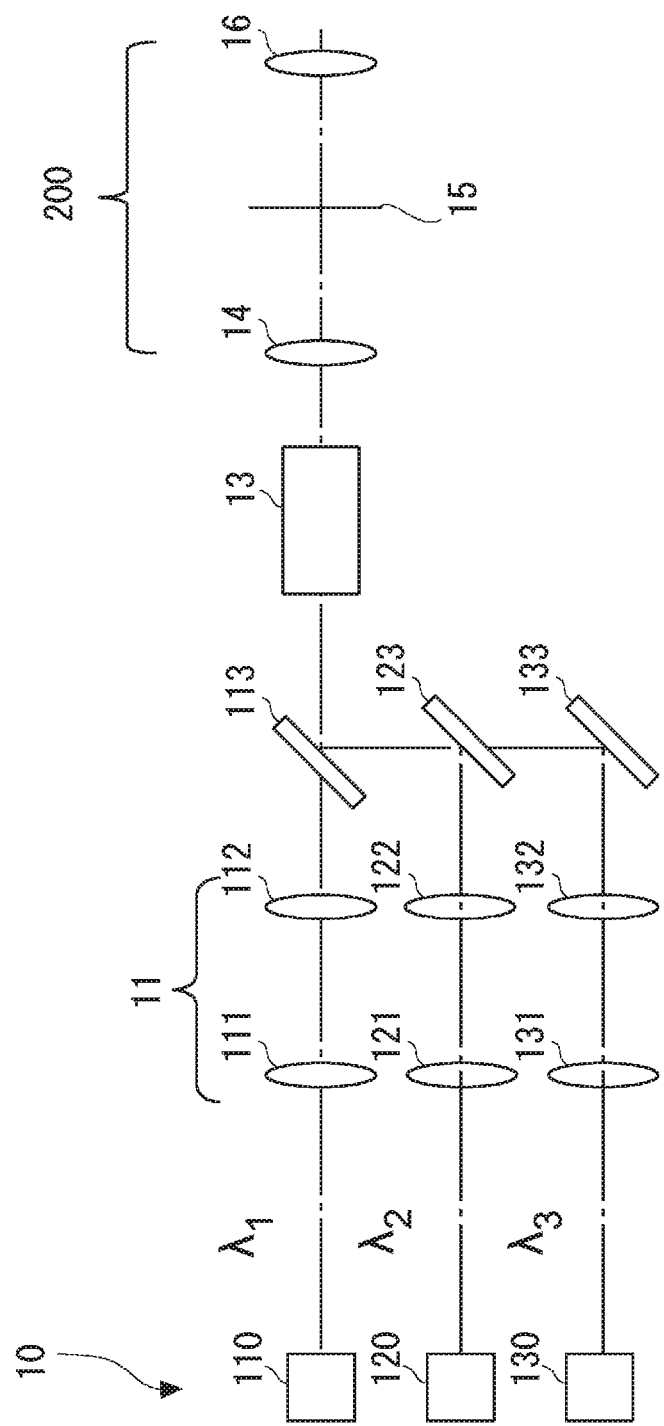
FIG. 6 is a diagram showing a configuration of a light source.

A plurality of laser light sources having wavelengths different from each other may be used, and a beam expander capable of adjusting the degree of focus or the degree of divergence of the light beam for each laser wavelength may be provided in each of the laser light sources. FIG. 6 shows a modified example of the relay optical system 200 configured to change the degree of focus and the degree of divergence of the light beam in accordance with the wavelength.

Three light sources 110, 120, and 130 having laser wavelengths different from one another are provided as the light source 10. The light source 110 is a laser light source that generates a laser light having a wavelength λ1. The light source 120 is a laser light source that generates a laser light having a wavelength λ2. The light source 130 is a laser light source that generates a laser light having a wavelength λ3.

The light beam having the wavelength λ1 generated in the light source 110 enters a dichroic mirror 113 via the beam expander 11 formed of lenses 111 and 112. By adjusting the positions of the lenses 111 and 112, the degree of focus or the degree of divergence of the light beam having the wavelength λ1 can be adjusted. The light beams having the wavelength λ2 generated in the light source 120 enters a dichroic mirror 123 via the beam expander 11 formed of lenses 121 and 122. By adjusting the positions of the lenses 121 and 122, the degree of focus or the degree of divergence of the light beam having the wavelength λ2 can be adjusted. The light beam having the wavelength λ3 generated in the light source 130 enters a dichroic mirror 133 via the beam expander 11 formed of lenses 131 and 132. By adjusting the positions of the lenses 131 and 132, the degree of focus or the degree of divergence of the light beam having the wavelength λ2 can be adjusted.

The dichroic mirror 113 causes the light beam having the wavelength λ1 to transmit therethrough and reflects the light beams having the wavelengths λ2 and λ3. The dichroic mirror 123 causes the light beam having the wavelength λ3 to transmit therethrough and reflects the light beams having the wavelength λ2. The dichroic mirror 123 reflects the light beams having the wavelength λ3. Accordingly, the optical paths of the light beams having the wavelengths λ1, λ2, and λ3 are combined. It is also possible to combine the optical paths of the light beams using a beam splitter instead of using the dichroic mirrors 113, 123, and 133. By adjusting the positions of the lenses 111, 112, 121, 122, 131, and 132, it is possible to change the degree of focus and the degree of divergence of the respective light beams independently. Then the light beam from the dichroic mirror 111 enters the Y-directional scanning unit 13.

In FIG. 6, the relay optical system 200 can be formed of two lenses 14 and 16, as disclosed in Patent Literature 1. The light beam deflected by the Y-directional scanning unit 13 is refracted by the lens 14 and then enters the diaphragm 15. The lens 14 focuses the light beam onto the surface of the diaphragm 15. The diaphragm 15, which includes, for example, a circular opening, shields external light beams. That is, the passage of the light beams deviated from the opening are restricted. It is preferable that the area of the Y-directional scanning unit 13 where the scanning speed is not constant be shielded by the diaphragm 15. According to this configuration, it is possible to make the illuminance intensity of the linear area uniform.

The light beam that has been transmitted through the diaphragm 15 is refracted by the lens 16 to become collimated light beam. The beam splitter 17 shown in FIG. 1 is provided in the subsequent stage of the lens 16, although the beam splitter 17 is not shown in FIG. 6. The lenses 14 and 16 are made of synthetic quartz glass and calcium fluoride and these lenses are designed to be optimized for light with the degree of focus and degree of divergence that vary depending on the wavelength, whereby it is possible to obtain an optical system in which chromatic aberration is sufficiently corrected in a wide wavelength band from a deep ultraviolet region to a near infrared region.

Correction of Distortion Aberration that Occurs in Relay Optical System 300

Figure 7:
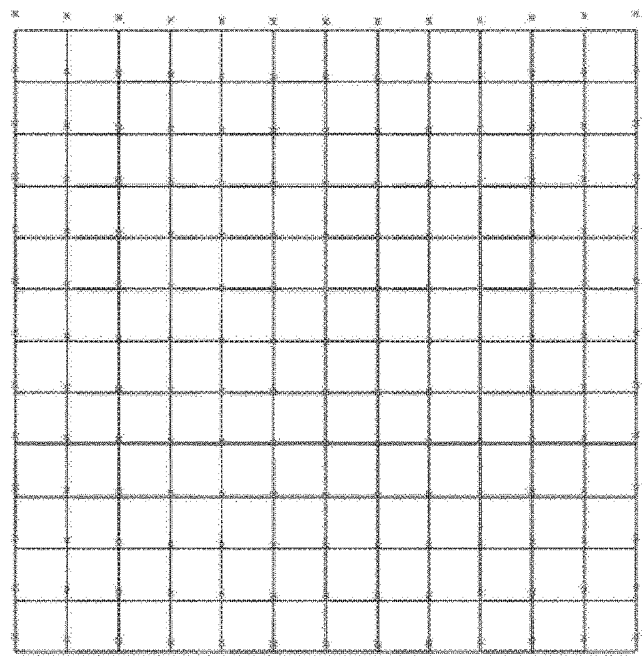
FIG. 7 is a diagram for explaining distortion aberration generated in the optical system shown in FIG. 3.

In the relay optical system 300 shown in FIG. 2 or 3, distortion aberration occurs. FIG. 7 is a diagram for describing the distortion aberration that occurs in the optical system shown in FIG. 3. The square lattice shown in FIG. 7 is obtained by connecting the focal positions when light having an angle in the X direction and the Y direction with respect to the reference axis is directly made incident on the objective lens having no distortion aberration by a line. The points plotted in FIG. 7 are the positions of the focal point when light having an angle with respect to the reference axis is made incident on the objective lens 21 having no distortion aberration from the position of the X-directional scanning mirror 18 shown in FIG. 3 via the relay optical system 300.

The plots shown in FIG. 7 can be obtained by performing ray tracing on design data. As shown in FIG. 7, when the angle of the X direction is changed while fixing the angle of the Y direction, the spot position is changed in the Y direction depending on the angle of the X direction. On the other hand, when the angle of the Y direction is changed while fixing the angle of the X direction, there is little change in the X direction of the spot position. In other words, the spot position is changed only in the Y direction in response to the change in the angle of the Y direction. Therefore, the linear area where the sample 22 is illuminated is preferably an area extended along the Y axis. In other words, the linear area scanned by the Y-directional scanning unit 13 is preferably along the direction that corresponds to the geometric symmetry axis of the first off-axis parabolic mirror 301. That is, in the configuration shown in FIG. 2, the linear area is parallel to the Y axis, and the geometric symmetry axis of the first off-axis parabolic mirror 301 is parallel to the Y axis.

According to this configuration, distortion aberration can be corrected by performing calculation of data for each measurement of the linear area. That is, if the optical system is rotated about the Z axis by 90 degrees between the X-directional scanning mirror 18 and the first off-axis parabolic mirror 301 in the relay optical system 300 shown in FIG. 3, the linear area where the sample 22 is illuminated is extended along the horizontal axis shown in FIG. 7. According to this technique, when, for example, data in an area along one line on the sample is acquired, measurement of the linear area curved due to distortion aberration is repeated a plurality of times by changing the measurement area, and the obtained data needs to be interpolated, thereby obtaining the measurement results. At this time, it is required to interpolate two-dimensional data for each measurement wavelength. When the linear area is made to have the direction along the vertical axis shown in FIG. 7, it is not required to perform interpolation from the measurement data of the linear area obtained from the measurement performed a plurality of times. The distortion aberration can be corrected by performing interpolation processing on the measurement data of each linear area. Further, the calculation can be made simple since the results can be obtained from interpolation processing of one-dimensional measurement data.

When the angle of the Y direction is fixed and the angle of the X direction is changed in FIG. 7, the spot position is changed in the Y direction depending on the angle of the X direction. This change can be corrected by calculation using interpolation processing, as described above. For example, the processor 50 executes this interpolation processing, whereby the distortion aberration can be corrected. Specifically, the outgoing light from the linear area illuminated with the light beam is dispersed by the spectroscope 31. The detector 32 includes a plurality of pixels arranged in the direction orthogonal to the direction in which the dispersed outgoing light is dispersed. The plurality of pixels arranged in one line along the direction orthogonal to the dispersion direction detect the outgoing light in one specific wavelength. Then one-dimensional measurement data detected by the plurality of pixels is interpolated in the direction orthogonal to the dispersion direction. The processor 50 performs interpolation processing on the measurement data for each linear area. The processor 50 acquires a Raman scattered light image in which the distortion aberration has been corrected.

Figure 8:
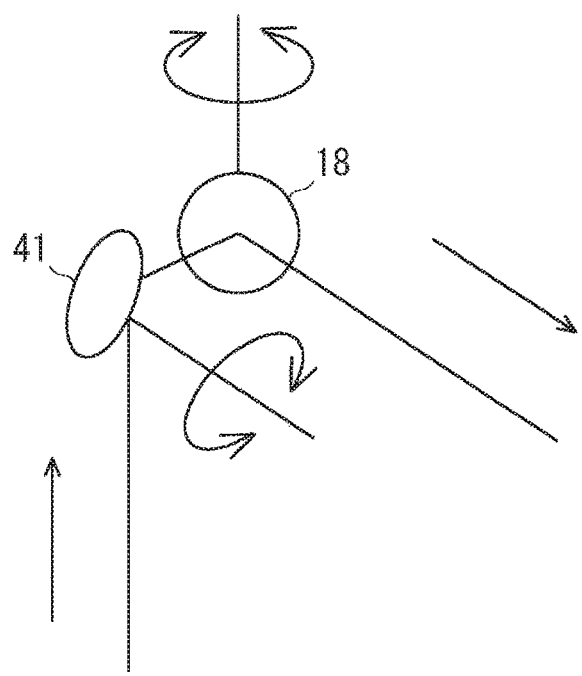
FIG. 8 is a diagram showing a configuration for reducing the distortion aberration.

Alternatively, the distortion aberration may be corrected by adding a Y-directional scanning mirror 41 just before the X-directional scanning mirror 18, as shown in FIG. 8. The Y-directional scanning mirror 41, which is a third scanner, scans the spot position of the light beam in the Y direction on the sample. In the configuration shown in FIG. 8, the scanning angle of the Y-directional scanning mirror 41 is changed in accordance with the scanning angle of the X-directional scanning mirror 18, whereby the distortion aberration can be corrected. The overall structure of the optical microscope when the Y-directional scanning mirror 41 is arranged just before the X-directional scanning mirror 18 as shown in FIG. 8 is similar to that shown in FIG. 1 of Patent Literature 2.

Figure 9:
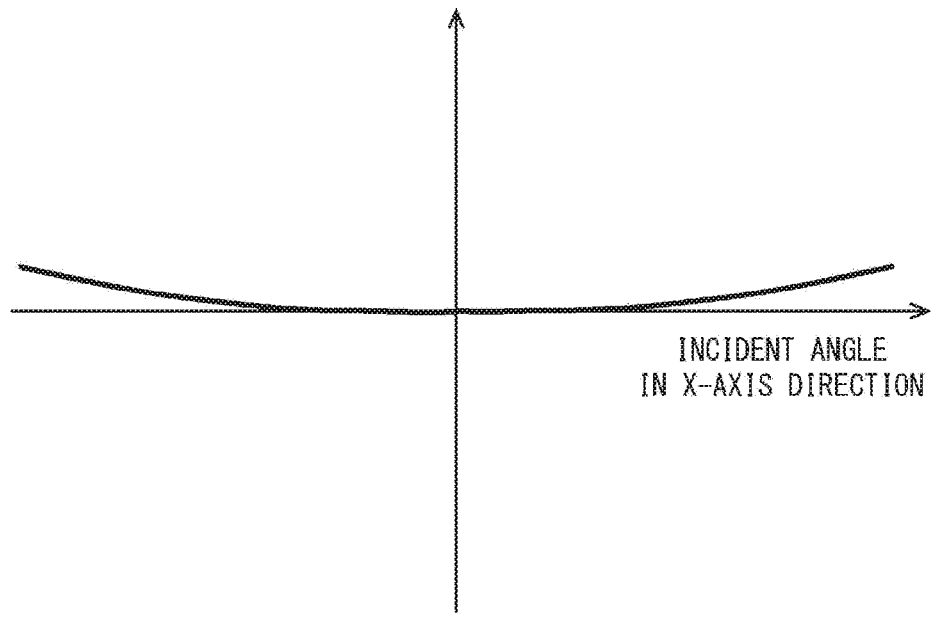
FIG. 9 is a diagram for explaining correction of the distortion aberration.

FIG. 9 shows a relation between the incident angle in the X-axis direction and the spot position in the Y-axis direction by the distortion aberration. It is sufficient that the angle of the Y-directional scanning mirror 41 be changed so as to cancel the change in the spot position shown in FIG. 9.

Figure 10:
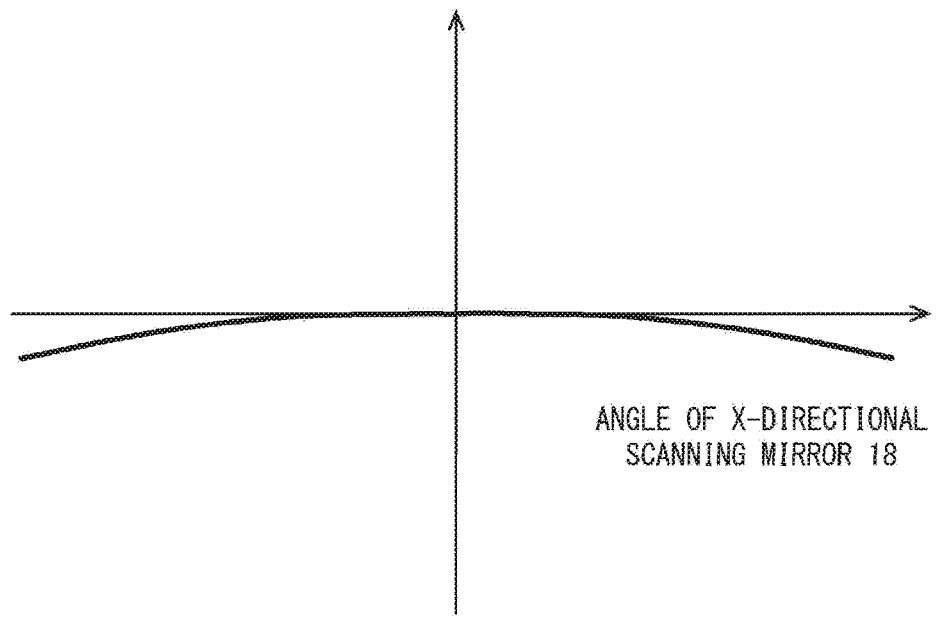
FIG. 10 is a diagram for explaining correction of the distortion aberration.

FIG. 10 is a graph showing a relation between the scanning angles when the scanning angle of the Y-directional scanning mirror 41 is changed so as to cancel the change in the spot position by the distortion aberration shown in FIG. 9. In FIG. 10, the horizontal axis indicates the angle of the X-directional scanning mirror 18 and the vertical axis indicates the angle of the Y-directional scanning mirror 41. It is sufficient that the scanning angle of the X-directional scanning mirror 18 and that of the Y-directional scanning mirror 41 be changed in association with each other so as to cancel the change in the spot position by the distortion aberration.

Configuration in which Beam Spot is Extended in One Direction

Figure 11:
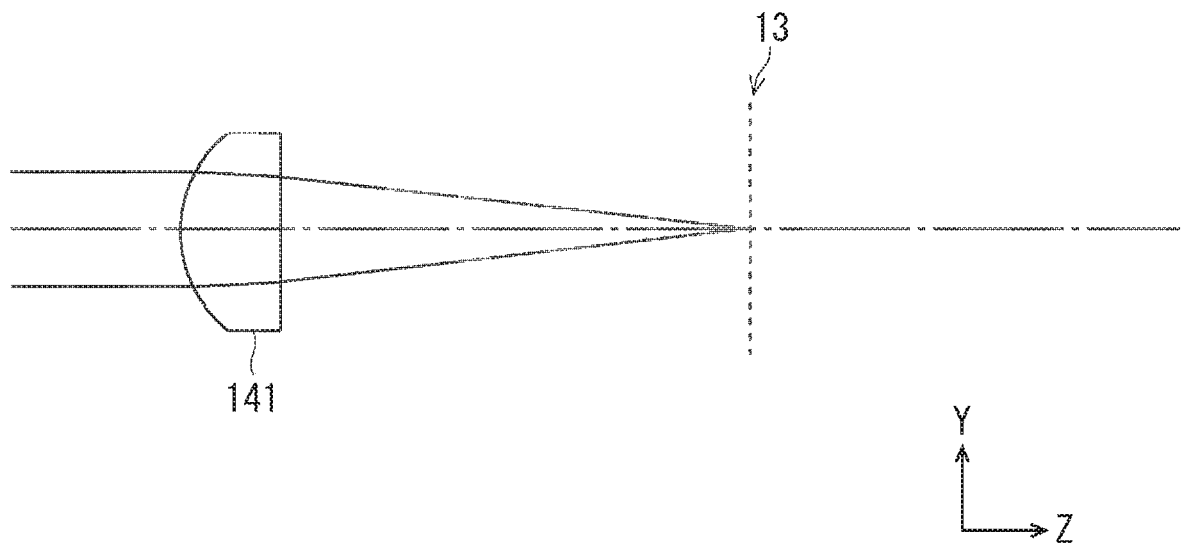
FIG. 11 is a diagram showing a configuration for shrinking a beam cross-sectional shape in one direction.

In order to prevent damages in a sample, it is preferable to extend the beam spot in the sample 22 in one direction. The beam spot in the sample 22 can be extended, for example, by using an optical system shown in FIG. 11. In FIG. 11, a cylindrical lens 141 is added just before the Y-directional scanning unit 13. The cylindrical lens 141 focuses the light beam in the position of the Y-directional scanning unit 13.

The light beam that has been focused is shrunk in the Y direction in the position of the Y-directional scanning unit 13 to have a cross-sectional shape extended along the X direction. At this time, the beam spots extended in parallel to each other along the Y direction are formed in the sample 22. That is, the beam spots that are extended in the direction the same as the scanning direction by the Y-directional scanning unit 13 can be obtained.

When the laser light beams having different wavelengths are used, it is sufficient that the cylindrical lens be moved in the Z direction depending on the wavelength in such a way that the position of the Y-directional scanning unit 13 is focused. Alternatively, by focusing the position of the Y-directional scanning unit 13 using the reflecting mirror having a cylindrical surface, the above adjustment can be omitted. Alternatively, a cylindrical lens having a concave surface may be arranged after the Y-directional scanning unit 13, as disclosed in Patent Literature 1.

Figure 12:
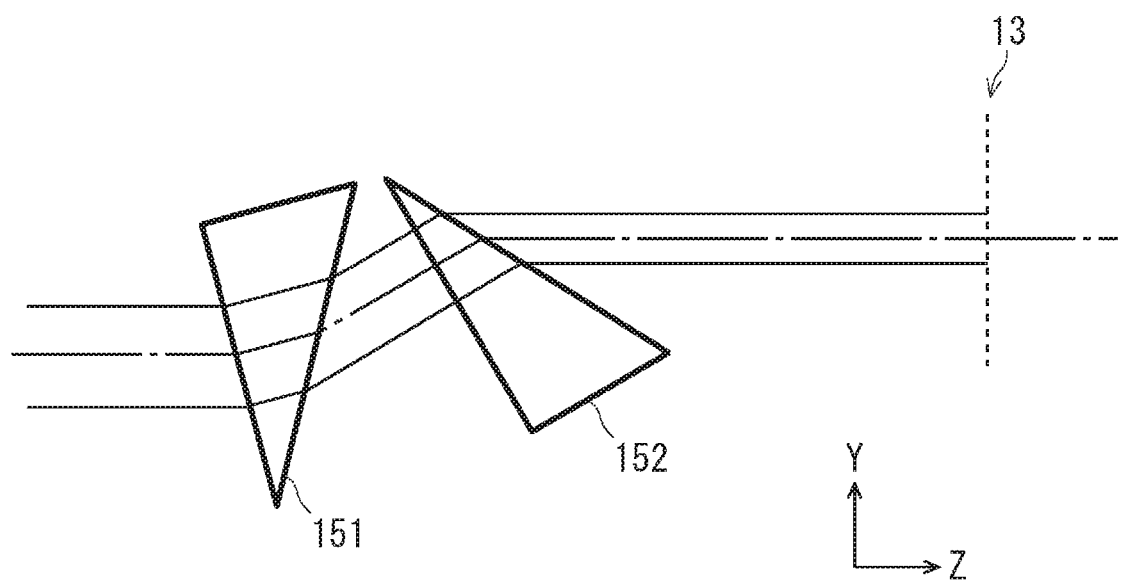
FIG. 12 is a diagram showing another configuration for shrinking the beam cross-sectional shape in one direction.

When the available laser intensity is not too large, even when the amount of extension of the beam spot in the sample 22 is small, it is possible to prevent the sample from being damaged. When the amount of extension of the beam spot is small, the configuration shown in FIG. 12 may be used. In FIG. 12, anamorphic prisms 151 and 152 are added just before the Y-directional scanning unit 13. By using the two anamorphic prisms 151 and 152, the beam cross-sectional shape can be shrunk in the Y direction, and this beam is made incident on the Y-directional scanning unit 13 having an elliptical beam cross-sectional shape.

Figure 13:
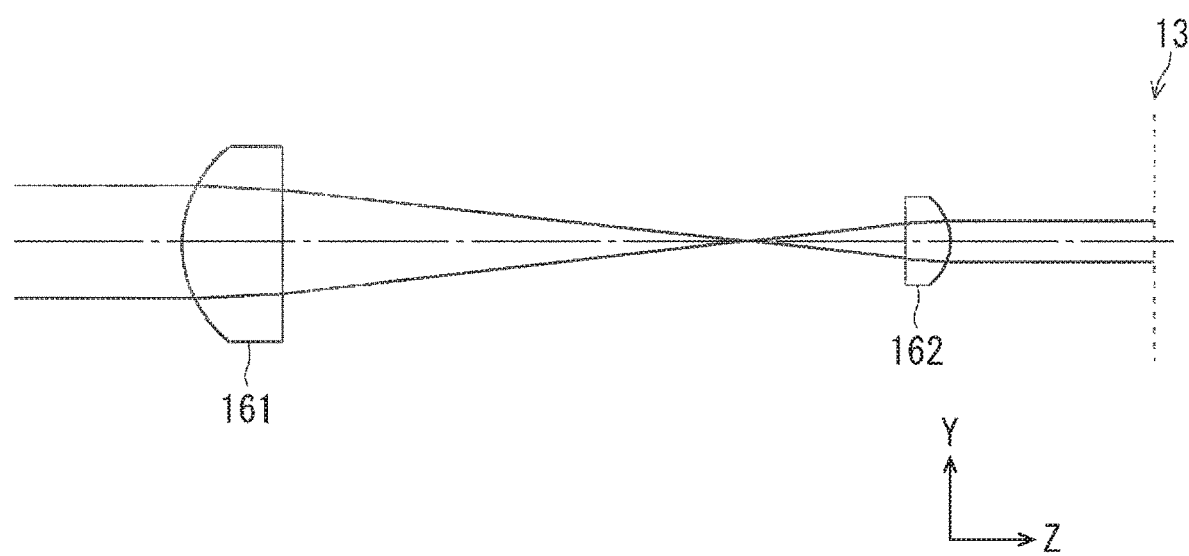
FIG. 13 is a diagram showing another configuration for shrinking the beam cross-sectional shape in one direction.

Alternatively, in order to shrink the light beam in one direction, as shown in FIG. 13, two cylindrical lenses 161 and 162 may be used. The cylindrical lenses 161 and 162 are arranged just before the Y-directional scanning unit 13.

The cylindrical lenses 161 and 162 and the like shrink the beam cross-sectional shape at the position of the Y-directional scanning unit 13 in the Y direction. Then the beam spot at the position of the sample 22 is extended in the Y direction in accordance with the amount of shrinkage of the beam cross-sectional shape at the position of the Y-directional scanning unit 13. For example, the cylindrical lenses 161 and 162 and the like may shrink the beam to $\frac{1}{5}$ or $\frac{1}{3}$. When the beam is shrunk to $\frac{1}{5}$, the beam spot is extended more than that when the beam is shrunk to $\frac{1}{3}$. In this way, the amount of extension of the beam spot in the sample 22 can be adjusted.

In the optical system shown in FIG. 11, the beam spot in the sample 22 can be extended more than that in the optical system shown in FIGS. 12 and 13. On the other hand, when the beam spot is extended too much, the intensity of the laser irradiated onto the measurement area may become too small. By extending the beam spot relatively small so as to prevent the damage in the sample 22 by the optical system shown in FIGS. 12 and 13, the area to be measured can be illuminated with the laser light more efficiently. At this time, the scanning range by the Y-directional scanning unit 13 is preferably adjusted in accordance with the area to be measured.

While a case in which the beam cross-sectional shape at the position of the Y-directional scanning unit 13 is shrunk in the Y direction has been described in the above description, the cross-sectional shape of the beam may be changed by extending the beam cross-sectional shape in one direction using the optical systems shown in FIGS. 12 and 13 in the opposite manner. At this time, the expansion rate of the beam in the beam expander 11 is adjusted.

As shown in FIGS. 11-13, by shrinking the cross-sectional shape of the light beam in the Y-directional scanning unit 13 in the Y direction, it is possible to prevent the sample 22 from being damaged. In FIGS. 11-13, the cylindrical lens or the anamorphic prism is not the only one to be used as the optical member configured to shrink the cross-sectional shape of the light beam in the Y-directional scanning unit 13 in the Y direction, and various other optical members may be used.

Objective Lens 21

The objective lens 21 can be switchably used for each wavelength band to be measured. Otherwise, when a wide wavelength band is measured at one time, a Schwarzschild-type reflective objective lens may be, for example, used.

While the configurations of the relay optical system 300, the relay optical system 200, and the focus optical system 400 have been described in the above description, not all the configurations may be used. That is, only a part of the configurations shown in FIGS. 2-13 may be used for the optical microscope 100 shown in FIG. 1.

If, for example, the relay optical system 300 has the configuration shown in FIG. 2 or 3, the configurations of the relay optical system 200 and the focus optical system 400 are not limited to those shown in FIG. 4, 5, or 6. Further, the relay optical system 200 may have a configuration shown in FIG. 2 or 3. In this case, the configuration of the relay optical system 300 is not limited to the one shown in FIG. 2 or 3. As a matter of course, the relay optical system 300 preferably has the configuration as shown in FIG. 2 or 3 and the relay optical system 200 preferably has the configuration as shown in FIG. 5 or 6. Further, the focus optical system 400 preferably has the configuration shown in FIG. 4. The optical system other than those shown in FIGS. 2-6 may be, for example, the optical system that uses the lens, as disclosed in Patent Literature 1 and 2.

As described above, the optical microscope according to this embodiment includes the light source; the first scanner configured to deflect the light beam from the light source and scan a spot position of the light beam on a sample; the objective lens configured to focus the light beam deflected by the first scanner and cause the light beam to be made incident on the sample; the spectroscope configured to spatially disperse the outgoing light emitted from an area on the sample onto which the light beam has been illuminated in accordance with the wavelength; the two-dimensional array photodetector including light-receiving pixels arranged in an array, the two-dimensional array photodetector detecting the outgoing light dispersed by the spectroscope; and the first relay optical system including the first off-axis parabolic mirror that is arranged in the optical path from the first scanner to the objective lens and reflects the light beam deflected by the first scanner and the second off-axis parabolic mirror that reflects the light beam reflected in the first off-axis parabolic mirror. The first relay optical system may be at least one of the relay optical system 200 and the relay optical system 300 shown in FIG. 1.

According to the aforementioned optical microscope, Raman spectrum may be measured. While the optical microscope 100 configured to perform spectroscopic measurement on the Raman scattered light has been described in the above description, the present disclosure is not limited thereto. It is sufficient that a spectroscopic measurement apparatus configured to detect an outgoing light emitted from a sample in a wavelength different from a laser wavelength of an incident light be used. A spectroscopic measurement apparatus configured to detect fluorescence excited by an excitation light or a spectroscopic measurement apparatus configured to detect infrared absorption may be, for example, employed. According to these spectroscopic measurement apparatuses as well, aberrations can be prevented.

While the present disclosure made by the inventors has been described in detail with reference to the embodiment, the present disclosure is not limited to the aforementioned embodiment. As a matter of course, various changes can be made within the scope of the present disclosure.

This application is based upon and claims the benefit of priority from Japanese Patent Application No. 2017-157778, filed on Aug. 18, 2017, the disclosure of which is incorporated herein in its entirety by reference.

REFERENCE SIGNS LIST

10 Light Source
11 Beam Expander
13 Y-directional Scanning Unit
17 Beam Splitter
18 X-directional Scanning Mirror
21 Objective Lens
22 Sample
23 Stage
30 Entrance Slit
31 Spectroscope
32 Detector
40 Stage Driver
50 Processor
100 Microscope
200 Relay Optical System
201 Second Concave Mirror
202 Second Convex Mirror
203 Third Convex Mirror
204 Third Concave Mirror
300 Relay Optical System
301 First Off-axis Parabolic Mirror
302 Second Off-axis Parabolic Mirror
303 First Correcting Lens
304 Second Correcting Lens
400 Focus Optical System
401 First Concave Mirror
402 First Convex Mirror

The invention claimed is:

1. An optical microscope comprising:
a light source configured to generate a light beam;
a first scanner configured to deflect the light beam and scan a spot position of the light beam on a sample;
an objective lens configured to focus the light beam deflected by the first scanner and cause the light beam to be made incident on the sample;
a spectroscope including a slit on an incident side which an outgoing light emitted from an area on the sample onto which the light beam has been illuminated enters;
a two-dimensional array photodetector including light-receiving pixels arranged in an array, the two-dimensional array photodetector detecting an outgoing light from the spectroscope; and
a first relay optical system including a first off-axis parabolic mirror and a second off-axis parabolic mirror, the first off-axis parabolic mirror being arranged in an optical path from the first scanner to the objective lens and reflecting the light beam deflected by the first scanner, and the second off-axis parabolic mirror reflecting the light beam reflected in the first off-axis parabolic mirror,
wherein a second direction that corresponds to a longitudinal direction of the slit is along a direction that corresponds to a geometric symmetry axis of the first off-axis parabolic mirror.

2. The optical microscope according to claim 1, wherein geometric symmetry axes of paraboloids of the first off-axis parabolic mirror and the second off-axis parabolic mirror are arranged to be parallel to each other and the paraboloids are arranged to face in directions opposite to each other.

3. The optical microscope according to claim 1, wherein a focal length of the first off-axis parabolic mirror is equal to a focal length of the second off-axis parabolic mirror.

4. The optical microscope according to claim 1, wherein when a distance from a focal point of the light beam between the first off-axis parabolic mirror and the second off-axis parabolic mirror to the first off-axis parabolic mirror is denoted by L2 and a distance from the focal point to the second off-axis parabolic mirror is denoted by L3,
a ratio of L2 to L3 is equal to a ratio of the focal length of the first off-axis parabolic mirror to the focal length of the second off-axis parabolic mirror.

5. The optical microscope according to claim 4, wherein, when a distance from the first scanner to the first off-axis parabolic mirror is denoted by L1 and a distance from the second off-axis parabolic mirror to an entrance pupil of the objective lens is denoted by L4, L1=L2 and L3=L4 are satisfied.

6. The optical microscope according to claim 1, wherein the first relay optical system further comprises:
a first correcting lens having a positive power provided between the first off-axis parabolic mirror and a focal point of the light beam; and
a second correcting lens having a positive power provided between the focal point and the second off-axis parabolic mirror.

7. The optical microscope according to claim 6, wherein, when a distance from the first correcting lens to the focal point is denoted by L5 and a distance from the focal point to the second correcting lens is denoted by L6, L5=L6 is satisfied.

8. The optical microscope according to claim 1, further comprising a focus optical system configured to focus the outgoing light descanned by the first scanner on the slit of the spectroscope, wherein
the focus optical system comprises:
a first concave mirror configured to reflect the outgoing light; and
a first convex mirror configured to reflect the outgoing light reflected in the first concave mirror.

9. The optical microscope according to claim 8, wherein the first concave mirror and the first convex mirror are spherical mirrors whose curvature radii are substantially equal to each other.

10. The optical microscope according to claim 8, wherein an image plane of the sample imaged by the focus optical system is inclined with respect to an incident plane of the slit.

11. The optical microscope according to claim 8, wherein a line that passes a center of curvature of the first concave mirror and a center of curvature of the first convex mirror is inclined from a reference axis of the outgoing light that enters the first concave mirror.

12. The optical microscope according to claim 1, further comprising:

a second scanner that is provided in an optical path from the light source to the first scanner, deflects the light beam, and scans the spot position of the light beam on the sample; and a beam splitter that is provided in an optical path between the first scanner and the second scanner and separates the outgoing light emitted from the sample toward the spectroscope from the light beam emitted from the second scanner toward the first scanner, wherein the first scanner scans the spot position in a first direction that corresponds to a direction orthogonal to a longitudinal direction of the slit of the spectroscope, and the second scanner scans the spot position in a second direction that corresponds to the longitudinal direction of the slit.

13. The optical microscope according to claim 12, further comprising a second relay optical system arranged in an optical path between the second scanner and the first scanner, wherein the second relay optical system comprises:

a second concave mirror configured to reflect a light beam from the second scanner;

a second convex mirror configured to reflect the light beam reflected in the second concave mirror;

a third convex mirror configured to reflect the light beam reflected in the second convex mirror; and a third concave mirror configured to reflect the light beam reflected in the third convex mirror, and the second concave mirror and the second convex mirror are arranged to be symmetrical with the third concave mirror and the third convex mirror with respect to an intermediate image plane which is between the second convex mirror and the third convex mirror.

14. The optical microscope according to claim 13, wherein the second concave mirror, the second convex mirror, the third concave mirror, and the third convex mirror are spherical mirrors whose curvature radii are substantially equal to one another.

15. The optical microscope according to claim 13, wherein a line that passes a center of curvature of the second concave mirror and a center of curvature of the second convex mirror is inclined from a reference axis of the light beam that enters the second concave mirror, and a line that passes a center of curvature of the third concave mirror and a center of curvature of the third convex mirror is inclined from the reference axis of the light beam reflected in the third concave mirror.

16. The optical microscope according to claim 13, further comprising an optical member configured to shrink a cross-sectional shape of the light beam in the second scanner in the second direction.

17. The optical microscope according to claim 12, further comprising a second relay optical system arranged in an optical path between the second scanner and the first scanner, wherein the light source is capable of using the laser light beams having laser wavelengths different from each other by switching the laser light beams, the optical path of the laser light is provided with a beam expander configured to adjust the degree of focus or the degree of divergence, and the second relay optical system comprises:

a first relay lens configured to refract the light beam from the second scanner;

a second relay lens configured to refract the light beam from the first relay lens to obtain a collimated light beam, the second relay lens causing the collimated light beam to be made incident on the first scanner; and a diaphragm arranged between the first relay lens and the second relay lens.

18. The optical microscope according to claim 12, further comprising a third scanner that is provided just before the first scanner and scans the spot position of the light beam on the sample in the second direction, wherein the third scanner scans the light beam in the second direction depending on the angle of the first scanner so as to cancel a change in the spot position that occurs by distortion aberration of the first relay optical system.

19. The optical microscope according to claim 12, further comprising a processor configured to correct distortion aberration that occurs in the first relay optical system, wherein spots of the light beam on the sample are extended in a line form along the second direction, a plurality of pixels that detect the outgoing light from the linear area are arranged in the two-dimensional array photodetector, and one-dimensional measurement data detected by the plurality of pixels is interpolated, whereby distortion aberration is corrected.

20. A spectroscopic measurement method for performing spectroscopic measurement by performing the following processing of:

causing a light beam from a light source to be deflected by a first scanner;

causing the light beam from the first scanner to be made incident on an objective lens via a first relay optical system;

focusing the light beam by the objective lens and illuminating a sample with the light beam;

collecting an outgoing light emitted from the sample by the objective lens;

dispersing the outgoing light from the objective lens by a spectroscope; and detecting the outgoing light dispersed by the spectroscope, wherein the first relay optical system comprises a first off-axis parabolic mirror that is arranged in an optical path from the first scanner to the objective lens and reflects the light beam deflected by the first scanner and a second off-axis parabolic mirror that reflects the light beam reflected in the first off-axis parabolic mirror, wherein a second direction that corresponds to a longitudinal direction of the slit is along a direction that corresponds to a geometric symmetry axis of the first off-axis parabolic mirror.

* * * * *